United States Patent [19]
Kitchin et al.

[11] Patent Number: 5,539,812
[45] Date of Patent: *Jul. 23, 1996

[54] METHOD AND APPARATUS FOR DETECTING AN ATTEMPTED THREE-WAY CONFERENCE CALL ON A REMOTE TELEPHONE

[76] Inventors: Dwight W. Kitchin, 7392 S. Vance St., Littleton, Colo. 80123; Alan K. Schott, 7898 S. Magnolia Way, Englewood, Colo. 80112; John C. Johnson, 12168 Monaco Dr., Brighton, Colo. 80601; Clive L. Smith, 7654 S. Monaco Cir. West, Englewood, Colo. 80111

[*] Notice: The term of this patent shall not extend beyond the expiration date of Pat. No. 5,319,702.

[21] Appl. No.: 336,001

[22] Filed: Nov. 8, 1994

Related U.S. Application Data

[63] Continuation-in-part of Ser. No. 326,076, Oct. 19, 1994, abandoned, which is a continuation of Ser. No. 194,741, Feb. 8, 1994, abandoned, which is a continuation of Ser. No. 921,901, Jul. 29, 1992, Pat. No. 5,319,702.

[51] Int. Cl.$^6$ .............................. H04M 3/20; H04M 1/66
[52] U.S. Cl. .................... 379/189; 379/199; 379/386
[58] Field of Search .......................... 379/93, 112, 114, 379/123, 132, 144, 145, 155, 157, 158, 159, 162, 189, 190, 199, 201, 211, 286, 377, 386, 424

[56] References Cited

U.S. PATENT DOCUMENTS

| | | | |
|---|---|---|---|
| 3,626,107 | 12/1971 | Armstrong et al. | 179/18 BC |
| 3,660,610 | 5/1972 | Hestad et al. | 179/18 BC |
| 4,387,274 | 6/1983 | Stein et al. | 179/99 |
| 5,283,825 | 2/1994 | Druckman et al. | 379/167 |
| 5,319,702 | 6/1994 | Kitchin et al. | 379/189 |

*Primary Examiner*—Jeffery Hofsass
*Assistant Examiner*—Daniel S. Hunter
*Attorney, Agent, or Firm*—Rothgerber, Appel, Powers & Johnson

[57] ABSTRACT

Methods and apparatus for use in connection with a telecommunication between a local telephone and a remote telephone, which are capable of detecting whether one of the parties to the communication has attempted to initiate a three-way, i.e., conference, call by using a hook-flash signal. The apparatus includes a low pass filter for passing energy having frequencies below about 500 Hz, and an energy detector for detecting a specific electrical energy pulse characteristic of the hook-flash having passed through the low pass filter. The existence of the hook-flash is confirmed by digital signal processing equipment which identifies a rapid drop-off in energy also characteristic of the hook-flash signal. Optionally, the hook-flash may be further confirmed by including software for cooperating with the energy detector to ascertain whether sound has occurred in the telecommunication during a predetermined period following the first hook-flash signal.

60 Claims, 20 Drawing Sheets

FIG. 1A   Analog Signal 1, Digital Signal 2
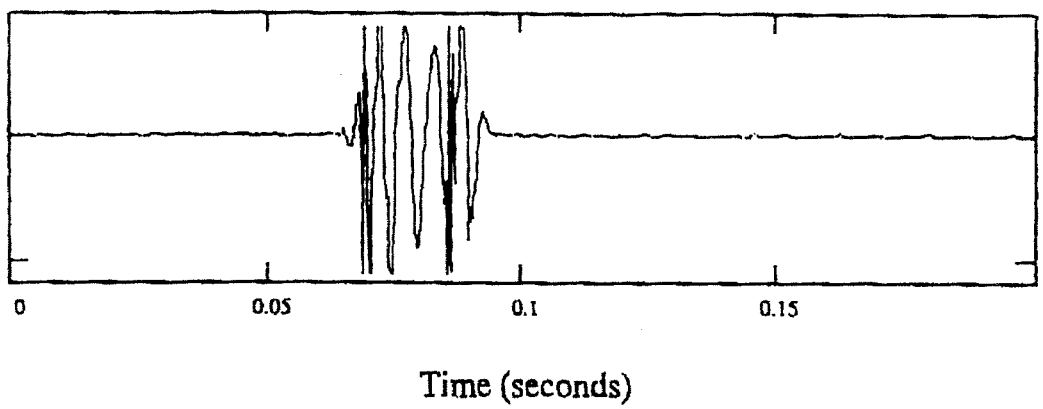
Time (seconds)
FIG. 1B   Signal 3
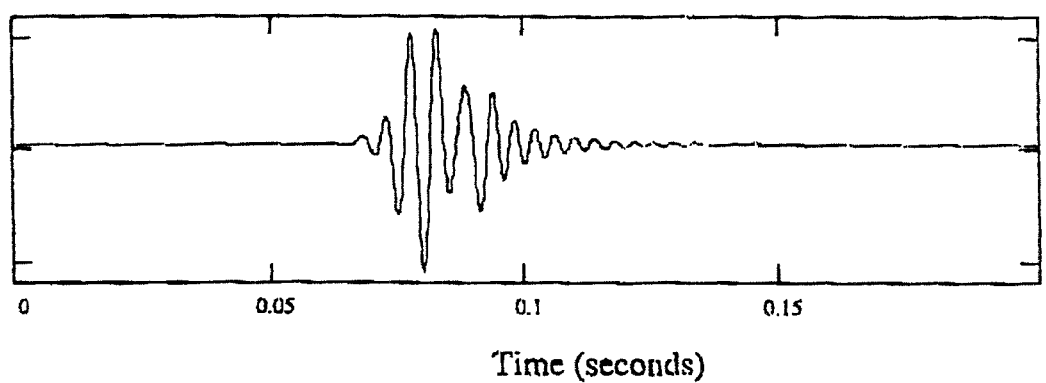
Time (seconds)
FIG. 1C   Signal 4
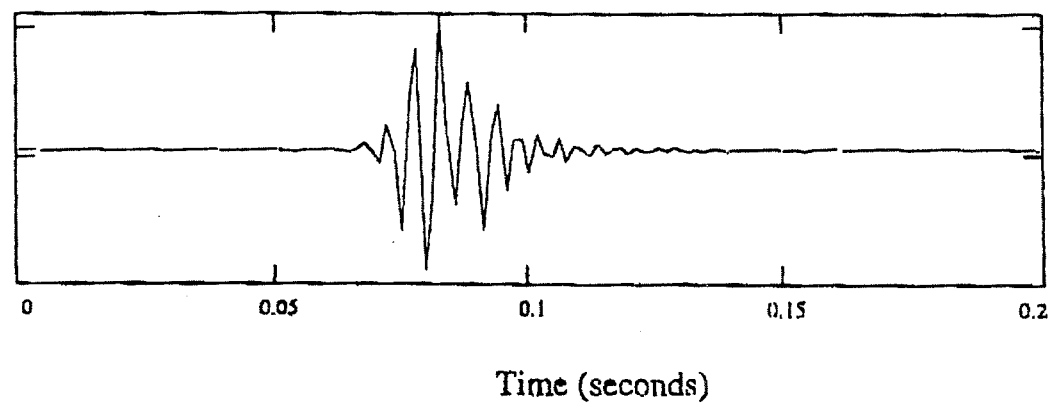
Time (seconds)

FIG. 1D    Signal 5
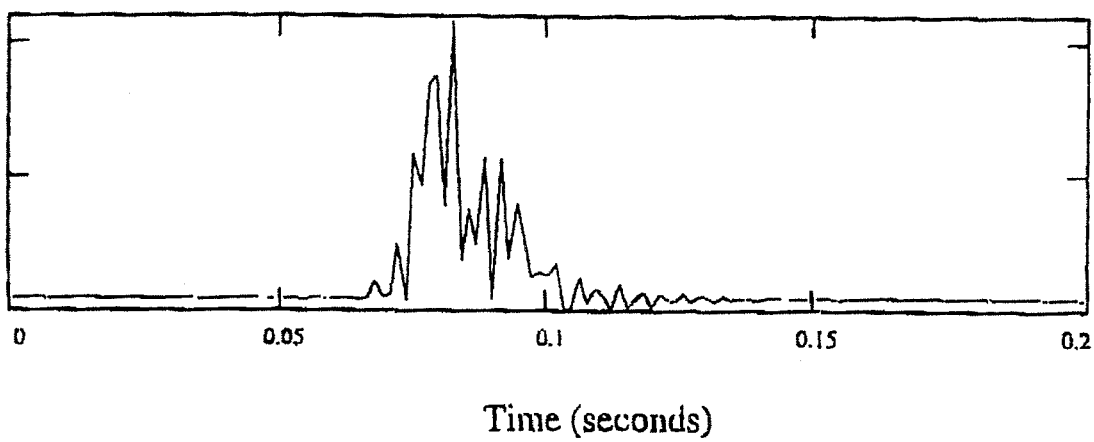
Time (seconds)
FIG. 1E    Strong Signal 6
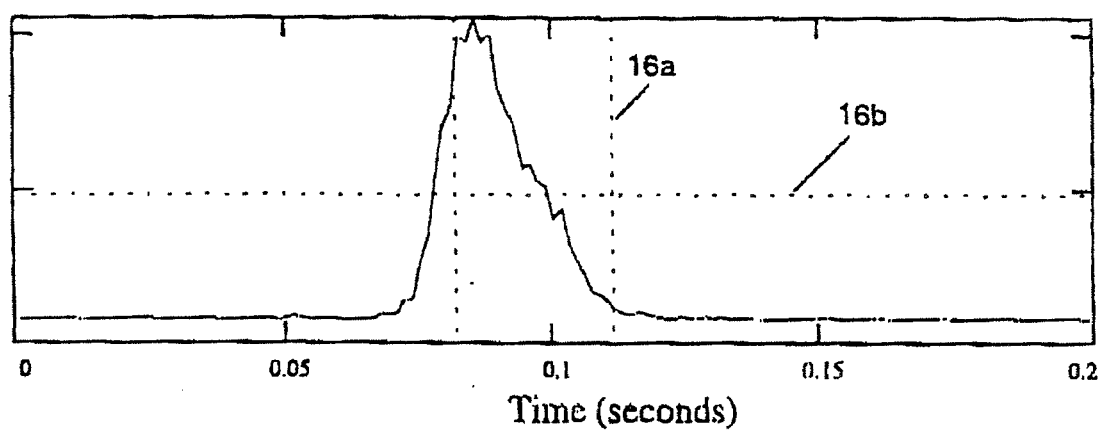
Time (seconds)
FIG. 1F    Weak Signal 6
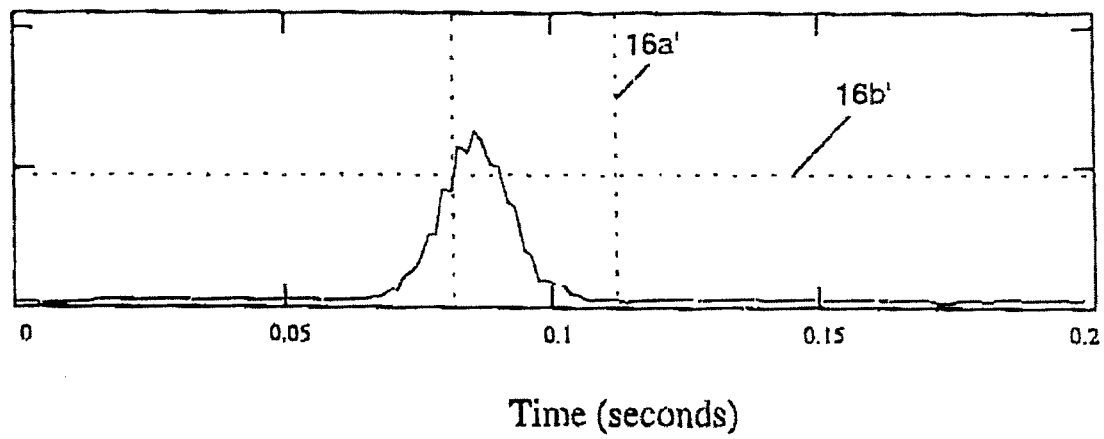
Time (seconds)

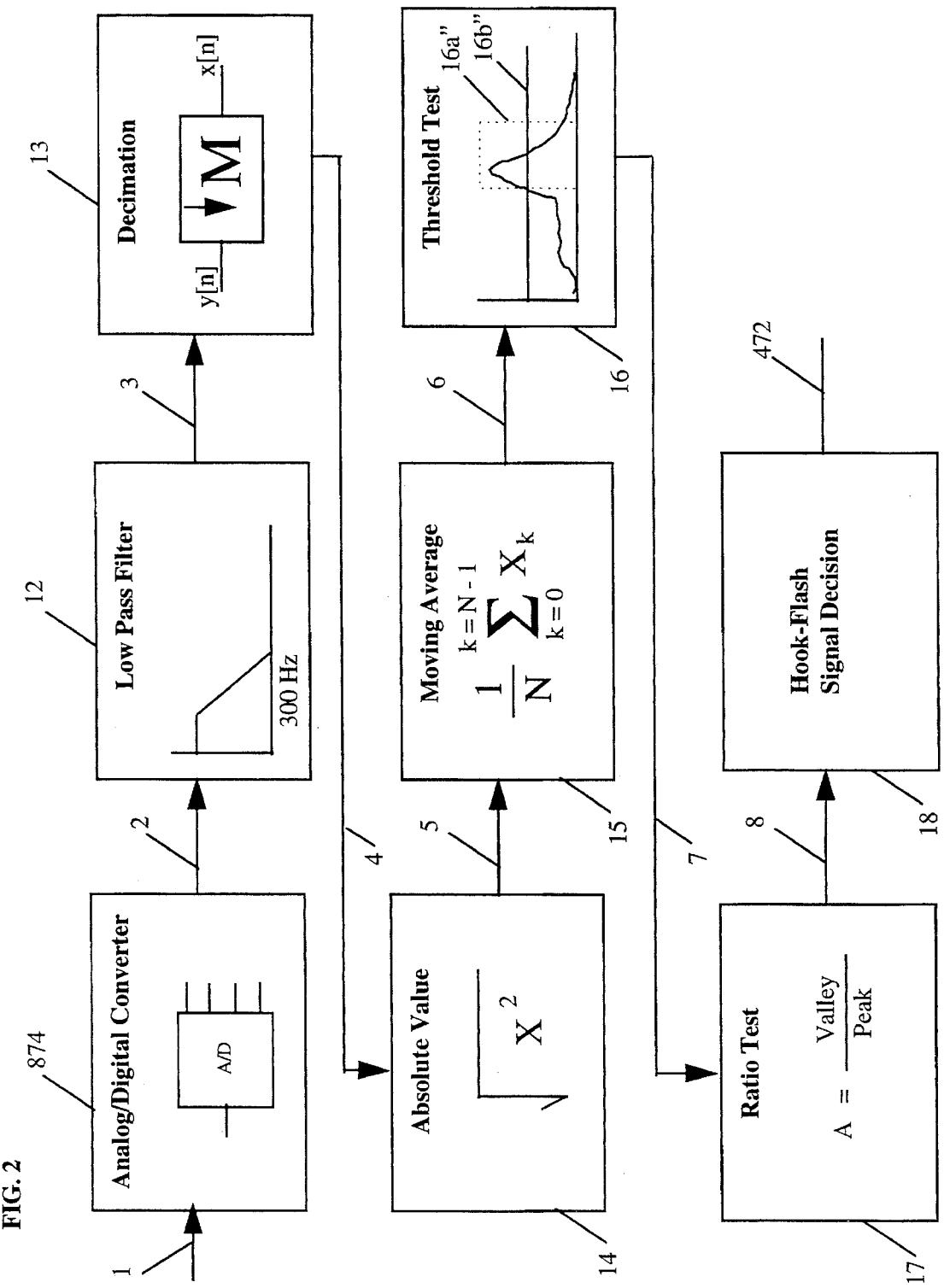

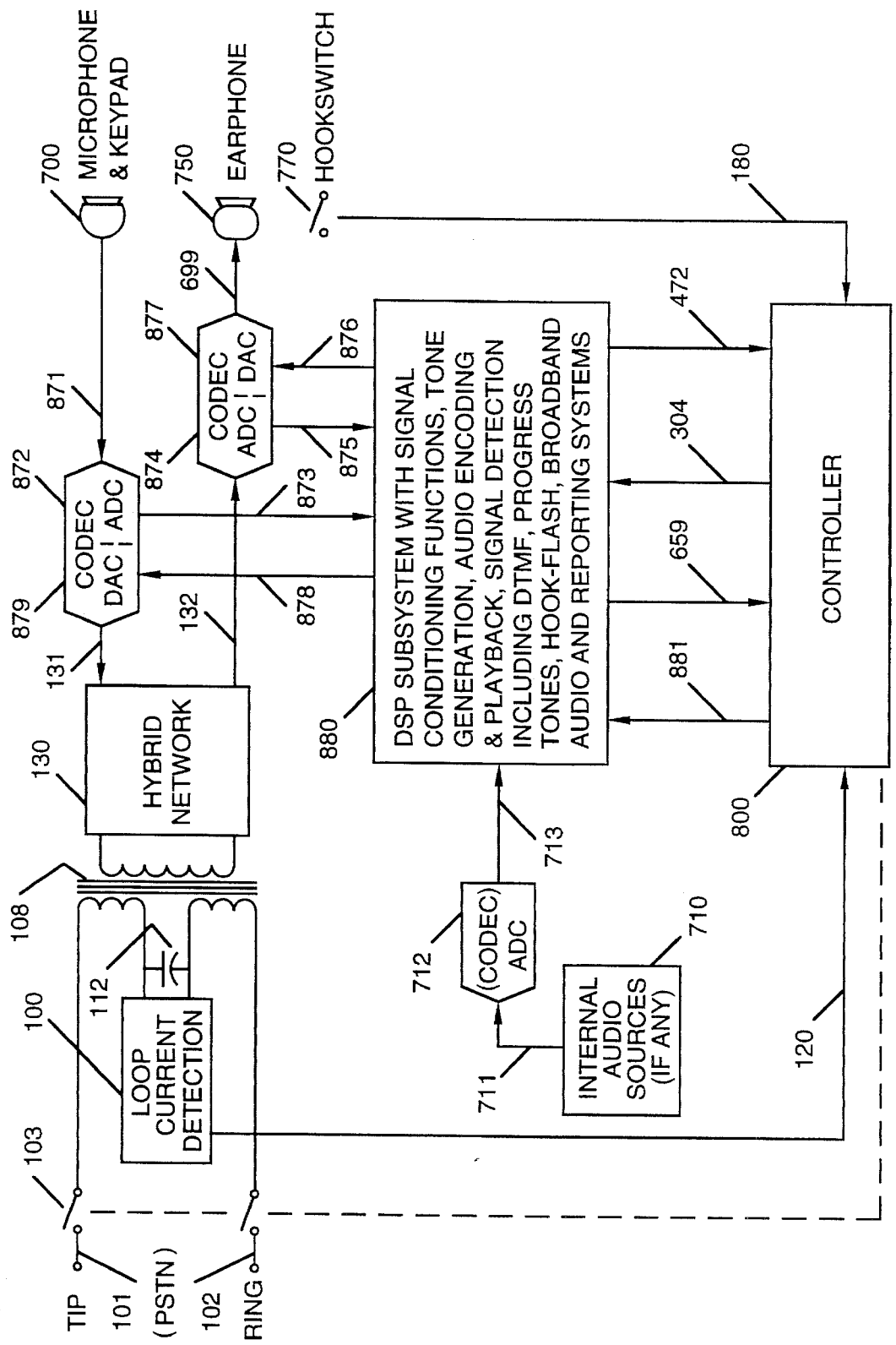

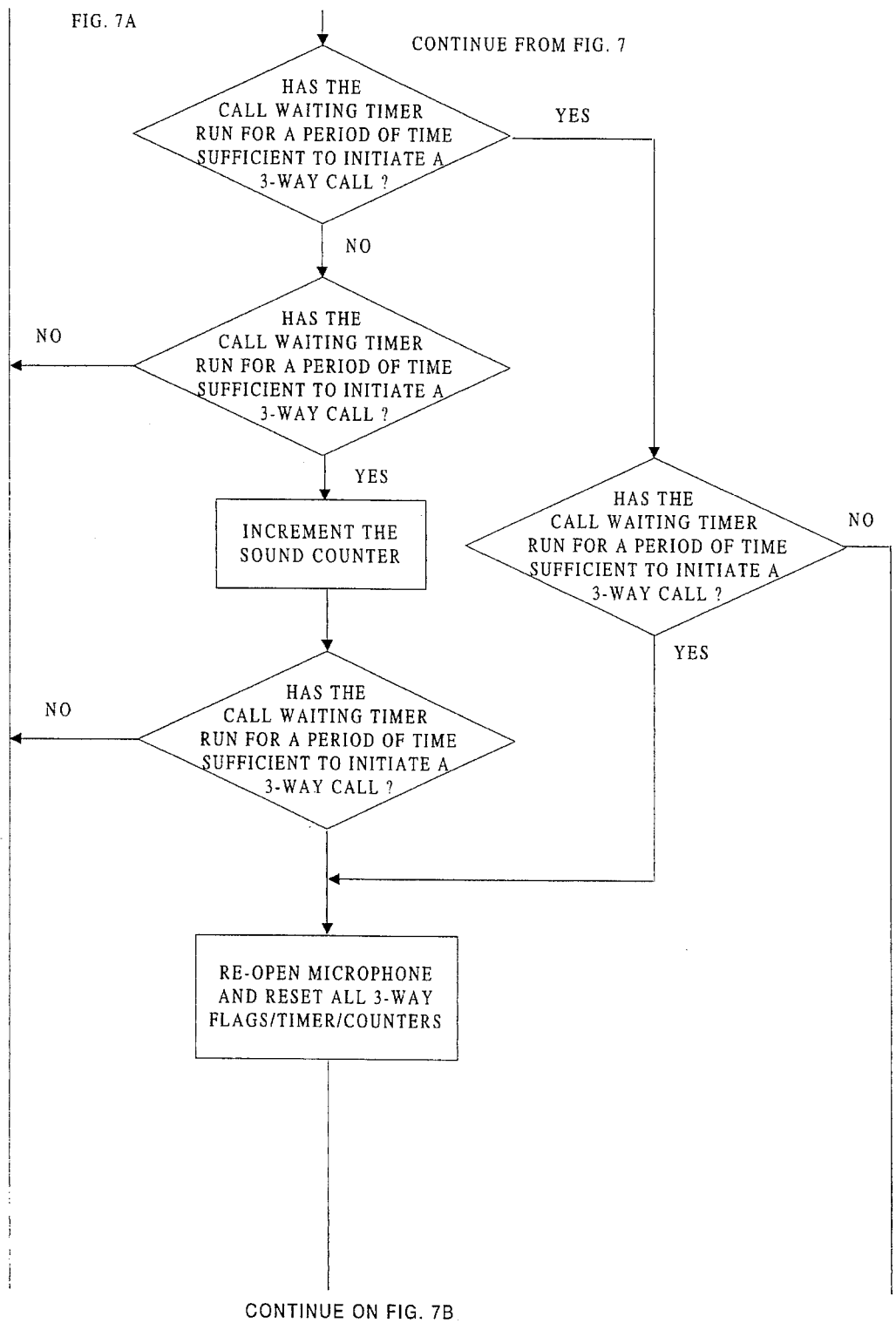

METHOD AND APPARATUS FOR DETECTING AN ATTEMPTED THREE-WAY CONFERENCE CALL ON A REMOTE TELEPHONE

This application is a continuation-in-part of application Ser. No. 08/326,076 filed Oct. 19, 1994, now abandoned which is a continuation of application Ser. No. 08/194,741, filed Feb. 8, 1994, now abandoned, which in turn is a continuation of application Ser. No. 07/921,901, filed Jul. 29, 1992, and is now U.S. Pat. No. 5,319,702 (the "'702 Patent").

TECHNICAL FIELD OF THE INVENTION

The invention described herein relates to hook-flash detection apparatus for use with a telephone system and which is capable of detecting when a called party has opened the telephone circuit by flashing (momentarily depressing) the hook switch of either a pulse-dial or tone-dial telephone which occurs when the called party attempts to initiate a "three-way call," i.e., a call which adds an additional party to the previously existing two-party call making it a "conference" call. The invention may also be used to detect when a called party has answered the phone and can distinguish a hook-flash or answer from other events, such as those associated with notification of a call waiting. The invention is typically employed with a computer such that the detection of an unwanted attempt to initiate a third-party call results in an action, such as, termination of the initial two party call.

The apparatus of the present invention may be located in association with the telephone initiating the call. For example, it may be contained on an "card" that is physically housed in a single telephone. It may also be embodied in the control system for a number of phones housed at a particular location, such as, the phone system for an institution, i.e., a prison, hospital or hotel. In embodiments, such as these, the apparatus of the invention is "connected" in the line at a point prior to the switch at the central office. The apparatus of this invention is also particularly suited for connection to a telecommunication between a local telephone in telecommunication with a remote telephone at a point within the telephone network. As used herein, the term "network" refers to any system in which the detection equipment is connected in the line at some point after the call reaches the initial switch at the central office, local exchange carrier ("LEC"), etc. In the network embodiment, the equipment is likely to be located at a site remote from the calling party, such as, at a local exchange, or at a private off-site facility to which calls are routed by the local exchange.

BACKGROUND OF THE INVENTION

Prior to a June, 1984, FCC decision, pay telephones were the exclusive province of local telephone companies. Others were precluded from the business of providing pay telephone services. Today, however, subject to state Public Utility Commission regulations, Customer Owned Coin Operated Telephone ("COCOT") service is permitted. An outgrowth of COCOT service has been the private operation of institutional telephone services. As might be expected, this "privatization" of phone systems has created a number of technical challenges including the automated detection of a called party's response to some appropriate prompt (such as, a request for acceptance of a collect call) by dialing a pulse-dial telephone and, in the case of prison systems, the prevention of three-way calling.

Coin telephones owned by local telephone companies generally utilize DC signals to signal called-party-answer. This information is transmitted between telephone company central offices and then to the originating pay telephone telling it, in effect, to accept payment for the call. This information is not, however, normally communicated to conventional, i.e., regular business and residential, telephones nor has this information been available to COCOT equipment.

Collect calls placed through COCOT equipment are typically handled by an automated operator service ("AOS"), thus providing the owner of the COCOT equipment with the ability to provide collect call service and bill users of that service for both intra- and inter-LATA calls. However, the use of an AOS for collect calls is expensive. In addition, it opens the possibility of fraudulent activity in certain instances.

In many institutions the phone calls placed by a patient/client or prison inmate are primarily, if not exclusively, collect calls. Collect calls initiated by a patient/client must be indicated as such to the called party. In addition, calls placed by an inmate to an outside party often begin with a prerecorded message stating that the call or collect call is from "a prison" and is being placed by "prisoner's name." In the above cases the called party is usually asked to dial a digit, commonly a "0" or a "1", to accept the call or the attendant charges. The phone system providing such service must be able to detect such acceptance both as a dual-tone-multi-frequency ("DTMF") tone response from a "Touch-Tone" phone as well as to detect the equivalent response on a pulse-dial telephone. ("Touch-Tone" is a trademark of the AT&T corporation.)

The clients/inmates in some institutions may be allowed to call only numbers on a pre-authorized list in order to deter fraudulent activity. A prison phone system, for example, must be able to detect the called party's flashing the hook switch in order to prevent the called party from activating three-way (i.e., conference) calling, dialing another number and then connecting the prisoner to an unauthorized phone number.

Accordingly, a need has arisen for a telecommunications system which can automate and simplify the processes currently handled by a traditional AOS. Specifically, a need has risen for telephone call handling equipment which can automatically route local and long distant calls without the intervention of an outside service or live operator, and which enables the telephone owner/service provider to charge for the completion of a call or collect call while preventing three-way calling.

Several methods of detecting a three-way call initiated by a hook-flash are known in the prior art. The hook-flash results in a temporary disconnect and reconnect which can be observed as a momentary interruption of loop current at the telephone company central office. The loop current loss, however, is not observed elsewhere in the network nor is the loop current loss made known to the respective parties. Thus, this attribute of a hook-flash cannot be employed, except at the central office. Alternatively, the attempt to initiate a three-way call has been detected utilizing the technology shown in the '702 Patent. That system, as based on analog technology, accurately detects the vast majority of attempted three-way calls. The current invention, which is based on the detection of additional characteristics of the hook-flash signal and utilizes digital signal processing ("DSP"), is more discerning of the attempted three-way call and more reliable in distinguishing an attempted three-way call from other events that occur on the telephone line (such as, voice fluctuations, noises from physical contact, e.g. dropping or tapping, of the handset, etc.).

SUMMARY OF THE INVENTION

The present invention addresses these needs by providing an apparatus for use in connection with a telecommunication between a local telephone in telecommunication with a remote telephone, wherein one of said telephones has a three-way calling service which is not associated with the apparatus. When the local equipment/telephone is in telecommunication with a remote telephone, (i.e., when a telephone call is established therebetween), the apparatus is capable of indicating whether the remote party has performed a specific act causing the generation of a hook-flash signal which is detected by the apparatus.

The apparatus of the present invention includes a low pass filter (or filter means) for passing energy having frequencies below about 500 Hz (preferably below 300 Hz and, even more preferably, in the range of 100–300 or 200–300 Hz) and an energy detector (energy detection means) for detecting a specific electrical energy pulse having been filtered by, i.e. passed through, the low pass filter and having a predetermined minimum magnitude which is characteristic of the hook-flash initiating a three-way call.

The apparatus further includes first means for confirming that the peak energy pulse identified as being above the predetermined minimum magnitude is, in fact, the result of a hook-flash. In that regard, an important part of this invention is the discovery that the hook-flash signal, which is characterized by a peak in energy below a certain frequency and above a minimum magnitude, is then followed by an immediate, precipitous drop (i.e., a "rapid drop-off" in energy. This characteristic spike of the hook-flash "click" sound is distinguishable from other intermittent sounds on the telephone, such as, the end of a word enunciated by a voice, in that the drop in energy associated with the latter is not precipitous. A typical signal initiated in the momentary disconnect and reconnect associated with a hook flash is shown in FIG. 1A. While the analog system disclosed in connection with certain figures of the '702 Patent, also identifies features characteristic of a hook-flash signal, it does not focus on the rapid drop off in energy which, we have now discovered is also characteristic of the hook-flash "click." Indeed, an analog system is not readily used for the storing and retrieval of line information from which an analysis of the energy over time can be made. While such an analysis could be performed with an analog system, it is much more difficult to implement than the DSP system described herein.

In the preferred embodiment of the present invention, the energy detected on the line (when in analog form) is sampled intermittently and repeatedly using DSP based circuitry (i.e., a "DSP analyzer"). The DSP analyzer stores the detected information in digital format and analyzes it to determine the existence of a peak energy below a maximum frequency and above a minimum energy level which is followed by a rapid drop off, all of which is characteristic of the hook-flash signal.

While the existence of the hook-flash signal can be determined by this means alone, the system can also contain software also referred to herein as "window analyzation means"(or "software window analyzer") as described in the '702 Patent. The window analyzation means also cooperates with the energy detector to provide second means for confirming the hook-flash attempting to initiate a three-way call on the telephone line. It is activated when the DSP analyzer determines that a hook-flash has occurred and operates by determining whether sound occurs on the line during a predetermined maximum time window following the first confirmation of the three-way call by the DSP analyzer. If sound is detected during window analyzation, it is likely that what was previously detected by the DSP analyzer, was not, in fact, a hook-flash signal associated with a three-way call. Thus, the use of the window analyzation means provides a further confirmation as to whether the remote party has attempted to initiate a three-way conference call.

The apparatus also includes response means for implementing a predetermined response when a three-way call is confirmed. Some of the responses which can be programmed into the software include call termination, playing a prerecorded message, generating a tone which may be heard by one or more parties to the call, muting the microphone of the local telephone and recording the date and time of the remote party's attempt to initiate the three-way call. Examples are illustrated in FIG. 9.

The invention is particularly suitable for use in a computer controlled telephone wherein the energy detector detects when a called party who has answered a call initiated by the computer operated telephone has activated (flashed) the hook switch. Such a system is depicted generally in FIG. 12B. However, an advantage of the present invention is that the apparatus may be located at a site remote from the computer controlled telephone. FIGS. 12A through 12D illustrate typical locations where the equipment may be located relative to a telephone network.

BRIEF DESCRIPTION OF THE DRAWINGS

A more complete understanding of the present invention may be derived by referring to the detailed description and claims which follow when considered in connection with the accompanying drawings, which are briefly described as follows.

FIG. 1A represents a characteristic signal of a hook-flash associated with the initiation of a three-way call and as it would be received by the apparatus of this invention either in analog or digital format. FIG. 1B through 1E represent the signal as processed and sampled at various points in the DSP analyzer, with FIG. 1E representing the final signal. FIG. 1E, the result of processing a relatively strong signal, can be compared to FIG. 1F, the result of processing a relatively weak initial signal.

FIG. 2 is a chart summarizing various steps in the DSP analyzer's processing of an incoming hook-flash signal, such as that shown in FIG. 1A.

FIGS. 4A through 4D are block diagrams of the hook-flash detection hardware of the present invention as connected in several different telephone line situations. FIG. 4A shows the apparatus as associated with a local telephone. FIG. 4B is a block diagram of the equipment as deployed in a local loop embodiment. FIG. 4C is a block diagram of the equipment as deployed in a 4-wire E&M connection. Finally, FIG. 4D is a block diagram of the equipment as deployed in an environment where the incoming signal is already in digital format. This would occur, for example, in many network configurations utilizing pulse code modulation ("PCM") or "DSØ" signals.

FIGS. 7, 7a, and 7b are a software flow diagram of the present invention for implementing a signal classification algorithm.

DETAILED DESCRIPTION OF THE INVENTION

Figure 3:
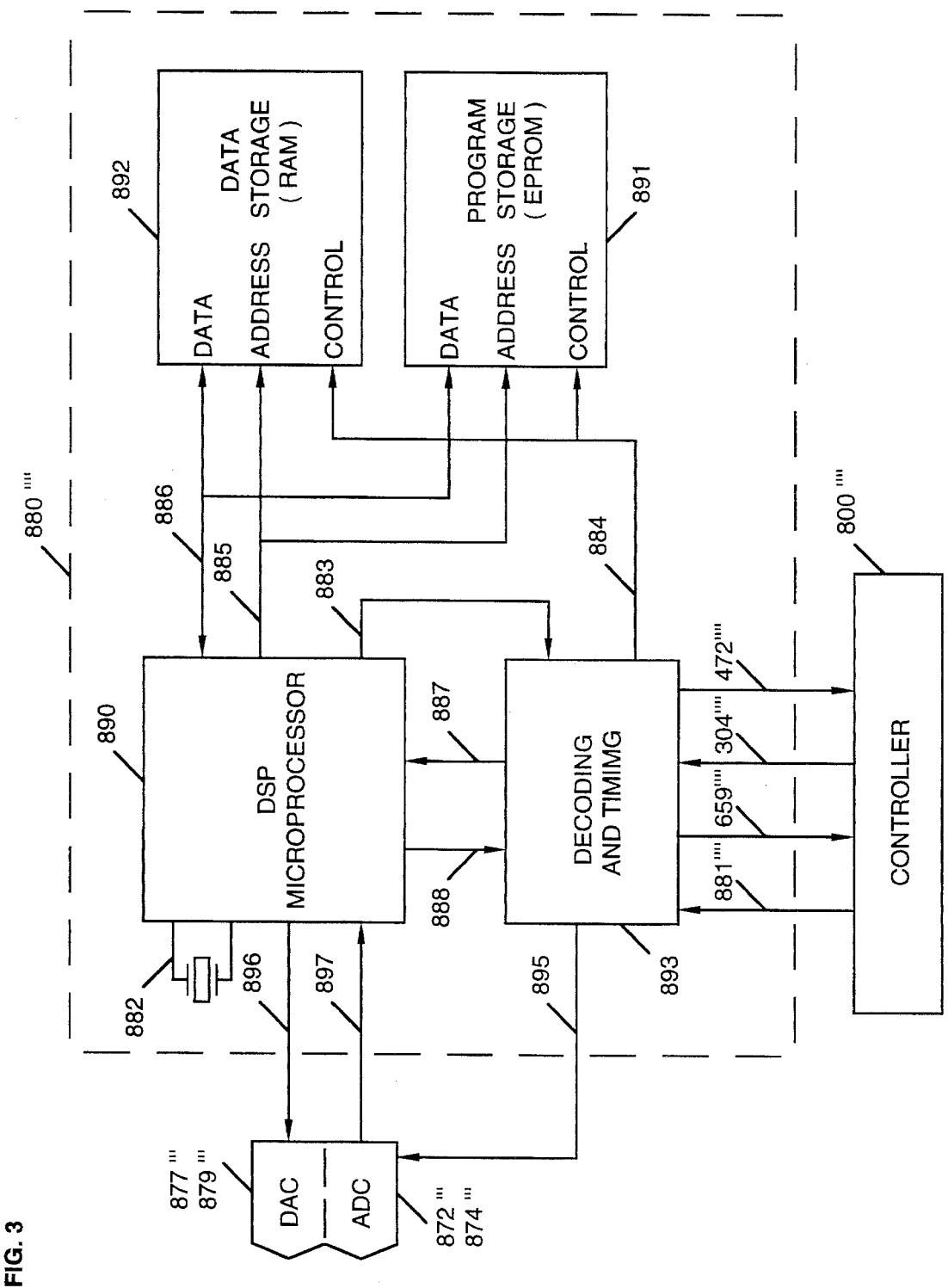
FIG. 3 illustrates the DSP subsystem circuitry.

A more complete understanding of the present invention may be derived by referring to the following detailed description and the accompanying FIGS. 1 through 12, wherein like reference numbers indicate like features throughout the drawings. In addition, reference designations for branch points in the flow diagrams and for signals contained in the schematic diagrams indicate connections which could not otherwise be adequately demonstrated due to space constraints.

The apparatus disclosed may be conventionally encased within a telephone set which may be modified for use as a public access telephone, modified for use as a prison inmate telephone or embodied as a physically separate control module to which a conventional telephone instrument is connected. Throughout the description of the present invention the terms "pay telephone," "telephone," "station" or similar terms should be construed in their broadest sense. The teachings of the present invention are applicable to all publicly accessible telecommunications devices which charge for each call made whether or not the particular device has actual coin receipt capability. The aforementioned terms when used herein are intended to include all such telecommunications devices.

The apparatus disclosed may also be incorporated within numerous types of telephone or non-telephone equipment where, in addition to some other primary purpose, the ability to remotely affect the operation of that equipment by use of a decadic, i.e. rotary or pulse, dialing telephone is desired. Examples would include answering machines and services, messaging services, tele-voting or tele-selection and operationally similar systems, VCR's or other appliances, sprinkler systems, or other premises automation systems.

A. DSP THREE-WAY CALL DETECTION:

Before discussing the detailed structure of the apparatus and its method of operation, it is helpful to understand, the basic steps by which an incoming signal is analyzed to detect the attempted initiation of a three-way call by the called party. FIG. 2 shows the functional blocks from the DSP three-way call detection algorithm when processing a signal resulting from a hook-flash initiation of a three-way call. The input signal, i.e., the characteristic signal of the hook-flash, is shown in FIG. 1A and the signal as modified at various stages in the processing are shown in FIGS. 1A through 1E. It is assumed for purposes of this description that the signal is an analog one and that the system is configured as shown in FIG. 4A.

Initially, the signal 1 passes through an analog to digital converter 874, which changes the signal from an analog voltage to a digital representation 2. The analog to digital converter is operated, for example, at an 8 KHz sampling rate. According to the Nyquist Theorem, this would allow an operating frequency passband of just under 4 KHz. With appropriate audio signal preconditioning to satisfy Nyquist requirements other sampling rates could be adequately employed.

The digitized signal 2 is then subjected to a lowpass filter 12, which in this case is a digital implementation of an infinite impulse response (IIR) filter. A suitable IIR filter is a 16th order filter with a 3 dB cutoff frequency of 300 Hz. The reason that an IIR filter is used versus a finite impulse response (FIR) filter is that the rolloff of the filter is much sharper in the transition band for a smaller order filter. The same transition band rolloff can be achieved with an FIR filter given that a significantly higher order filter is used. The higher order filter would translate to more processing time.

The reason that the 3 dB cutoff frequency is set to 300 Hz is directly related to the energy distribution of the hook-flash signal itself. The hook-flash signal from the initiation of the three-way call contains energy concentrated over the lower frequency extremes of the pass band of the telephone channel. Using this fact coupled with the fact that voice, data, and most other signals carried by the telephone channel nominally will contain little, if any, low frequency energy below 300 Hz, the cutoff frequency of the filter is set to 300 Hz. Also, due to the pass band characteristics of the phone channel, the hook-flash signal must contain significant energy in the lower frequency ranges in order to be seen at the calling party's phone as described in the '702 Patent. The resulting, i.e., filtered, signal 3 is as shown in FIG. 1B. One skilled in the art would understand that there are alternatives to determining the presence of such low frequency energy, such as, spectrum analysis in various forms.

The decimation step 13 is an optional step. The reason for including it in the hook-flash detection is to save processing time by the DSP processor 880. In the previous step, i.e., lowpass filtering, the signal 2 entering the filter is sampled at 8 KHz. This means that the signal is band limited to 4 KHz. The filtering step 12 further reduces the frequency content of the signal 2 down from 4 KHz to 300 Hz at signal 3. This means that the filtered signal 3 is now over-sampled and contains redundant information. By performing a decimation 13 by a factor of 12, the effective sampling rate is reduced from 8 KHz to 666 Hz. This removes unnecessary samples and only processes the samples containing non-redundant signal information. The resulting decimated signal 4 is shown as in FIG. 1C.

The signal 4 is then converted to an absolute value 5. The reason for using the absolute value function 14 is to allow the processing algorithm to operate with a single threshold value. If the algorithm did not use the absolute value function 14, then typically it would use both a positive and a negative level for the threshold. The use of a single threshold value greatly simplifies the algorithm. The absolute value of the signal 5 is as shown in FIG. 1D. As depicted, the absolute value is computed by calculating the square root of the square of the signal. However, it may also be appropriate to use other algorithms, e.g., using the square of the signal alone, which could have the advantage of emphasizing the differences in the signal for later computational purposes.

The moving average processing step 15 is used to smooth signal 5 to signal 6. The smoothed data 6 helps eliminate spurious responses during the threshold test 16 and the ratio test 17 of the detection algorithm. A useful moving average may result from the successive summation of the low pass filtered and decimated samples taken over the immediately prior 60 to 250 μS. A particularly convenient moving average can be computed using the sum of the current and immediately prior 120 μS of samples, which corresponds to the most current 8 decimated samples of signal 5. The resulting moving average signal 6 is shown in FIG. 1E. In contrast to FIG. 1E, FIG. 1F represents a relatively weak original signal that has been processed by the DSP analyzer.

The threshold test 16 is the beginning of the main processing portion for the three-way hook-flash detection algorithm. Up until this point, the signal processing has been data preparation and manipulation. The threshold detection block 16 contains two parameters, the processing window 16a and the signal threshold 16b.

The processing window 16a operates in the following manner. Depending on the width of window 16a, a number of samples of signal 6 are stored in data memory. The current sample arrives at the threshold processing block 16. The processor looks back a predetermined length of time, i.e., the width of the processing window 16a, and also uses the stored prior sample combined with the current sample for hook-flash signal detection. The window length 16a can be adjusted anywhere from a zero length window to multiple second length window. We have found that a window length 16a of approximately 39 mS is preferred. A potentially usable range for the window length would be from approximately 17 mS to 50 mS.

Due to the band limiting and normal Telco channel characteristics, most voice and data signals on the Telco channel display the characteristic of a relatively slow decay. The length of the above window 16a is important because one of the distinguishing characteristics of the hook-flash signal is the sharply dampened decay portion of the signal. Most signals carried by the telephone channel do not display this characteristic. If the window 16a is too short (e.g., less than 17 mS), this characteristic of the hook-flash may never be detected. This is because it is not realistic for a signal carried by the bandwidth-limited telephone channel to transition this quickly. If the window 16a is too long (e.g. above 50 mS), it could be possible to confuse other signals as a false hook-flash.

In addition, the absolute threshold 16b is used as a discriminator for noise versus hook-flash signal. The threshold 16b can be adjusted from a zero height to a full-scale height of 7.17 dBmØ(2.5 V). The preferred setting for the threshold is −32.8 dBmØ(25 mV). However, other settings in the range of approximately −60 dBmØ to −20 dBmØ. (i.e., 1 mV to 110 mV) can be used.

The height of the threshold 16b is an important consideration. If the level is too low, the DSP analyzer 880 will waste its time looking at background noise during a telephone conversation. If the threshold 16b is too high, the DSP analyzer 880 may never see a valid hook-flash signal in the channel. The preferred setting of threshold 16b is far enough above the nominal background noise and yet low enough so that the DSP analyzer will see only valid low-frequency signal energy on the telephone channel.

If the sample of signal 6 corresponding to the beginning of window 16a is above threshold 16b, the threshold test 16 will pass both the stored value and the current value as signal 7 to the ratio test 17. In any case, employing circular buffer techniques, the oldest value is then replaced by the current value resulting in the window 16a of recent values of signal 6.

As a first confirmation that a hook-flash signal has been detected, the DSP subsystem 880 also performs a ratio test 17 between current and prior samples of signal 6 as described above. Among other things, this portion of the processing eliminates the need for signal normalization as shown in the analog system of the '702 Patent. It is not necessary to scale the signal 1 because the test 17 looks at a ratio of numbers 7 rather than their absolute magnitudes. The ratio 8 measures the steepness (i.e., "effective slope") of the decay of the signal 6. A smaller ratio number corresponds to a steeper decay. A larger ratio number corresponds to a more gentle decay. The hook-flash signal does not cause a transition of signal 6 from peak voltage to valley voltage in zero time. This is because there is a finite amount of time required for a voltage in a bandwidth-limited channel, such as, signal 6, to decay. If the ratio 8 is large, the signal 1 is probably due to something other than a hook-flash signal. This is because most voice and data signals have some rolloff and some decay time associated with them. The decay time of other signals is usually much larger than that of the hook-flash signal.

The preferred ratio limit for the DSP hook-flash detection algorithm is 0.078, utilizing the 39 mS window and 120 μS moving average discussed previously. This means that the current sample 6 is less than 10 percent of the value of the stored prior sample 6 referred to in the threshold test 16. Other ratios in the range of approximately 0.05 to 0.17 may be useful, although the outer edges of this range could result in either false triggering or insensitivity.

The final stage of the DSP processing algorithm is the hook-flash signal detection decision 18. If the signal 8 passes test 18 using the appropriate ratio limit, then the signal is classified as a hook-flash signal to the overall control system 800 by interrupt signal 472. As described later, this signal to controller 800 causes window analyzation to commence which provides a second means for confirming the existence of the hook-flash signal. Alternatively, the signal could result in activation of the handling or response means resulting in one or more of the actions shown in FIG. 9 without further confirmation.

B. BLOCK DIAGRAM OF THE SYSTEM:

Having described the basic steps involved in detecting and confirming the existence of the hook-flash, it is now possible to explain the general organization of the hook-flash supervision architecture appropriate to implement the present invention as shown in FIGS. 3 and 4A through 4D.

1. DSP SUBSYSTEM:

FIG. 3 discloses a digital signal processing subsystem 880 for implementing the answer and three-way call detection features of the present invention. As shown in FIG. 3, a digital signal processor 890 is interconnected with other supporting components to complete the subsystem. A suitable DSP microprocessor 890 is the ADSP-2100 available from Analog Devices, Inc., of Norwood, Mass.

Depending on the exact implementation of the subsystem software and particular DSP 890, it may be that random access memory 892 ("RAM") in addition to that which may be provided in the DSP 890, as is the case of the above mentioned device, may be required. Suitable RAM 892 for use with the above mentioned DSP is a set of three TC55328

SRAM chips available from Toshiba America Electronic Components, Inc., of Sunnyvale, Calif. Three of the above 32K by 8 bit SRAM chips are required in the case of the ADSP-2100 to match the 24 bit data bus width of that particular device.

In many implementations, the DSP 890 may have internal preprogrammed instructions to implement the functions required by the present invention. As this is not always the case, external (to the DSP) program storage 891 is provided by erasable programmable read only memory ("EPROM") or as some other form of suitable non-volatile memory such as EEPROM, FLASH, battery supported SRAM, etc.

When required, DSP 890 makes use of the RAM 892 and EPROM 891 by presenting a memory address on the address bus 885 and then either reading existing data from either RAM 892 or EPROM 891 or writing new data to RAM 892. The data is carried between the DSP 890 and the memory 891, 892 over the data bus 886.

In most applications, decoding of the various control signals from the DSP 890 will be required to completely separate the various pieces of data coming into and out of the DSP 890. The appropriate decoding may be implemented using discrete logic gates or programmable logic devices. However, a particularly suitable device for the decoding function 893 is the field programmable gate array XC3042 available from Xilinx, Inc, of San Jose, Calif. This, or a suitable similar, device may provide the chip select, read and write strobes and other control signals 884 as are required by the specific implementation. In addition, this, or a suitable, similar device, can also provide the clock timing and data synchronization signals 895 to the analog to digital convertors 877 and 879 ("ADC" or the ADC portion of a coder/decoder "CODEC") and to the digital to analog convertors 872 and 874 ("DAC" or the DAC portion of a CODEC). A suitable CODEC for the present invention is the TP3054 available from National Semiconductor Corporation, Santa Clara, Calif. The digital data from the CODEC ADC's 872, 874 is shown connecting to the DSP 890 by serial data bus 897. In a similar manner, the digital data from the DSP 890 is shown connecting to the CODEC DAC's 877, 879 by serial data bus 896.

Crystal 882, or a similar fixed frequency oscillator is provided to ensure even data sampling as required by the DSP algorithms. A suitable oscillator is available from ECS, Inc., of Olathe, Kans.

Also shown in FIG. 3 are the communication signals of particular interest to and from the main controller 800. Block 800 is the microprocessor control section ("MCS"). MCS block 800 receives the detection signals from DSP subsystem 880 and other telephone status signals as may be useful and provides the control signals for all the blocks above requiring control and control of the rest of the telephone. MCS block 800 may be implemented using almost any microprocessor. However, particularly suitable microprocessors include the type V40 available from NEC Electronics, Inc., Mountain View, Calif.

The control signal 881 is used by the controller 800 to set up and change the operating mode of the DSP subsystem 880. This signal would conveniently be implemented as a mailbox register that would be written to by controller 800 and polled by the DSP subsystem 880. In a similar manner, signal 659 is used by the DSP subsystem 880 to send the results of various less time critical algorithms, such as tone detection and speech generation, to the main controller 800. This signal would conveniently be implemented as a mailbox register that would be written-to by the DSP subsystem and polled by the controller 800. Due to the possible speed differences between the DSP subsystem and the main controller, it is a particularly useful adaption of this mailbox register system to provide an interrupt to the controller 800 when the DSP subsystem writes new information into its portion of such a mailbox. As may be seen by those skilled in the art, the signals 659 and 881 are, in general, the normal intersystem communication signals. By comparison, the hook-flash detection interrupt signal 472 and muting signal 304 are probably asynchronous to other signals and this should be assumed to be the case unless the intersystem polling rate is very high. Hook-flash detection signal 472 is generated by the DSP subsystem 880 when an input signal entering the DSP subsystem 880 via signal 897 matches all of the hook-flash detection algorithm qualifications described elsewhere. As signal 472 is herein described as an interrupt signal, the controller 800 will very quickly determine an appropriate response. It may be that potential sound from the "controlled" telephone equipment cause or mask the existence of a hook-flash signal coming from the monitored, or remote, telephone. To prevent this in an analog system as described in the '702 Patent, an audio signal switch was provided to open up the microphone circuit from the controlled telephone. Where the telephone transmission between the parties is digital, it is necessary only to stop the flow of the digital data from signal 873 to signal 879 (See FIGS. 4A–4D) in order to accomplish the same objective. The mute signal 304 is thus provided so that the main controller 800 may immediately mute the audio from the controlled telephone equipment.

As just described, the DSP subsystem contains DSP algorithms to analyze the energy drop off to confirm the existence of a hook-flash signal. It is also possible to use other digital or analog techniques known now or hereafter to one skilled in the art to accomplish this same task. For example, autocorrelation is an alternative digital technique that might be utilized. Analog techniques could be employed including those utilizing a comparator and means for creating a time delay in the analog signal to compare it against the current one. Time delays, of course, can be created utilizing a charge couple device ("bucket brigade"), an "all pass" filter or other available means. All of these and other analog and digital techniques might be employed to determine the existence of a rapid energy drop off characteristic of the hook flash.

Other features of the invention as described herein can be implemented in either analog or digital form or combinations thereof.

2. SYSTEM ARCHITECTURE:

Refer now to FIGS. 4A–D and 12A–D. FIGS. 4A–D disclose four likely implementations for use of the present invention in telephone or telephone equipment related applications while FIGS. 12A–B disclose how the present invention may be connected relative to the various major parts of the public switched telephone network ("PSTN"). It will be clear to those skilled in the art that other combinations of input (controlled telephone equipment) connections and output (monitored or remote telephone equipment) connections are easily configured by appropriate use of the information provided.

Figure 12A:
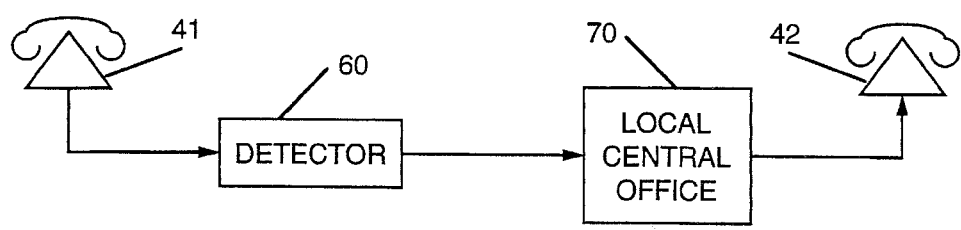
FIGS. 12A through 12D depict various options for locating the apparatus of the present invention relative to the local and remote telephones and the telephone network.

FIG. 4A pertains to telephone equipment wherein the apparatus of the present invention is included as a direct subsystem of the telephone equipment. FIG. 12A indicates the relative placement of the present invention in such an implementation.

As shown in FIG. 4A, the present invention is incorporated with the controlled telephone equipment, in this example shown as a conventional telephone user interface consisting of a listening point indicated as an earphone 750 and sound sources indicated as microphone and DTMF generating keypad both shown as 700. In addition, a user activation element is shown as hookswitch 770. An example of such an arrangement is a telephone handset, cradle hookswitch, and DTMF generating keypad. In such an application the circuit shown could be powered by a power supply deriving its standby power requirements from a small wall-type transformer. The following discussion assumes such an application.

When the user of the controlled telephone equipment lifts the handset from the cradle the hookswitch 770 automatically sends user request signal 180 to the controller wherein the controller would send a command to the DSP subsystem via command signal 881 to generate a user dialtone and to begin looking for sound or, perhaps more simply, for DTMF tones on signal 871. The DSP subsystem 880 then creates the proper sequence of digital patterns which are sent as the current signal 876 to DAC 877 which in turn translates the digital signal 876 into the appropriate voltage pattern as analog signal 699 which is heard by the telephone equipment user on the earphone 750.

When the telephone equipment user presses a key on the keypad DTMF tone will be generated which will be presented on signal 871, which is digitized by ADC 872 and sent to the DSP subsystem 880 as the current signal 873. As the DSP subsystem is currently looking for, at least, DTMF tones it will detect and recognize the first DTMF tone. The DSP subsystem could then automatically stop generating the user dialtone or wait for the controller 800 to so instruct but in any case would send the value or meaning of the detected DTMF tone to the controller 800 over the circuit for signal 659. If so designed, the controller 800 would instruct the DSP subsystem 880 to stop generating the user dialtone going to the user earphone 750 but to continue looking for additional DTMF tones on signal 871. Each key pressed by the telephone equipment user would similarly be detected and sent to the controller 800 until the controller 800 determines that a complete sequence of digits has been entered. At that point, the controller 800 may optionally send a command to the DSP subsystem via signal 881 to discontinue looking for additional sound and/or DTMF digits.

At this point, the controller 800 might, for example, determine if the sequence of digits entered by the telephone equipment user corresponds to an "invalid" telephone number. A number may be deemed "invalid," for example, if the telephone equipment user were attempting to place a collect call to a public coin telephone or if the telephone equipment user were a prison inmate attempting to call a witness whose telephone number was listed in an appropriate database. If the controller determines that the number is invalid, it may take appropriate action, such as denying the attempted call to that number.

When ready to forward the call to the number requested by the telephone equipment user, controller 800 would seize the line 101, 102 by activating an appropriate relay or switch indicated as relay 103. The loop current detector 100 completes the DC path for the LEC switch causing DC current to flow in through the TIP and RING wires from the serving central office. The indicated loop start circuits could easily be replaced by ground-start circuits by one skilled in the art. Controller 800 would also send a command to the DSP subsystem 880, via signal 881, to look for sound or, more particularly, network dialtone. Note that in this example the internal circuits of the present invention are isolated from the PSTN by transformer 108 and the loop current detector 100 which is commonly implemented using an optoisolator of sufficient voltage rating. Capacitor 112 is provided to complete the AC, or audio, path for the network TIP/RING pair. Note also that a two wire to four wire hybrid function 130 is provided to isolate the "outgoing" analog signals 131 from the "incoming" analog signals 132. The hybrid function 130 can be any of a number of the passive or active implementations well known in the art.

When the serving central office is ready to receive dialing instructions, it will send the dialtone signal on the TIP/RING pair. This signal will be coupled through transformer 108 to the hybrid function 130 where the dialtone signal is separated to the hybrid output signal 132. Signal 132, currently the network dialtone, is then connected to ADC 874 where the dialtone is converted to digital form and passed to the DSP subsystem 880 as signal 875. The DSP subsystem then passes information about the signal 132, 875 to the controller 880 via the reporting circuit signal 659. At this point the controller 800 would send an appropriate command to the DSP subsystem to prepare to generate DTMF tones via DAC 879 and a sequence of digits to the DSP subsystem to be sent to the PSTN. The DSP subsystem 880 accepts the command and digit sequence and proceeds to generate an appropriate digital pattern which is presented as signal 878 to the DAC 879 which in turn translates the digital pattern into an analog voltage 131. The hybrid function 130 takes the analog signal 131 and drives the transformer 108 and thus the PSTN TIP/RING pair with the requested DTMF tone. Clearly a pulse dial relay system could also be used to outpulse the requested digit sequence.

Two subsystems are available to send an audio, i.e. verbal, message to the telephone equipment user. First, the DSP subsystem can generate an appropriate sequence as signal 876, preferably as described by an internally stored message pattern. Alternately another audio source such as a recorded message or live microphone system indicated as 710 would provide the analog message 711 that can be digitized by ADC 712 into the digital signal 713 which the DSP subsystem would send as signal 876 to DAC 877 recreating signal 699 to the telephone equipment user earphone 750. A more direct, but perhaps more expensive, method would be to provide a direct analog path from source 710 to a mixer amplifier driving the earphone 750.

After the requested digit sequence has been delivered to the PSTN, the controller 800 would command the DSP subsystem 880 to look for noise or more specifically for hook-flash sounds. When the potential hook-flash sounds associated with the called party telephone equipment answering the call are detected by the DSP subsystem 880 the DSP subsystem 880 will preferably interrupt the controller 800 by signal 472. The controller may or may not have previously commanded the DSP subsystem to pass the digital signal 873 to signal 878. If so, the direct signal 304 may be used to mute the microphone 700 circuit. Alternatively, the DSP subsystem 880 could be commanded to pass only a portion of the microphone 700 signal such as through a high pass filter function perhaps with a low end pass frequency of 1500 Hz or so until the called party answer has been confirmed. After the called party answer has been confirmed controller 800 would proceed with an appropriate protocol and other command sequences not specifically concerned with the present invention. For the purpose of the present invention, at some point the combined controller 800 and DSP subsystem 880 can be assumed to enter a hook-flash detection state or mode. At that point, the DSP subsystem 880 will be looking for and reporting hook-flash signals to the controller 800 and the controller 800 will be using the window analyzation algorithm to detect call-waiting notification, call-waiting call acceptance, or three-way conference call attempts, or called party call termination, i.e., hanging up. (See FIG. 7.) The ADC 872 and DAC 879 in cooperation with appropriate high pass filter, or appropriate echo cancellation equivalent, software in the DSP subsystem 880 provide an effective high pass filter with, in this case, a lower pass frequency of about 300 Hz for signals 871 to the hybrid input signal 131. Since the monitored incoming signal 132 passes through the DSP subsystem via ADC 874 and DAC 877 cooperating with the DSP subsystem, this same input signal 132 can and is also low pass filtered, or functional spectrum analysis equivalent, to the hook-flash detector software subsystem. Each time the DSP subsystem 880 detects a hook-flash signal controller 800 will be notified via signal 472. Controller 800 can issue commands, for example, to stop passing audio from signal 871 to 131, i.e., mute the controlled sound source. In any case, all necessary circuits and components are provided to detect and respond to hook-flash related activity at the monitored telephone equipment.

While FIG. 4A shows certain features of the apparatus of the present invention, it does not illustrate the operation of the window analyzation means which can be employed as a second confirmation that a signal is a hook-flash signal. The software window analyzer includes a timer or timer means for cooperating with the energy detector so that the timer begins running for a first predetermined period (about 1.4 seconds) when a specific energy pulse is detected by the energy detector. The software window analyzer also includes sound detection means for detecting sound on a telephone line and for cooperating with the timer so that the sound detection means is activated at the end of the first predetermined period for a second predetermined maximum time period (up to about 1.3 seconds). If sound is not detected during the second predetermined time period, that further indicates that the remote party has attempted to initiate a three-way conference call.

The apparatus further includes signal interference prevention means for preventing signals originating at the local party's telephone from interfering with signals originating at the remote party's telephone. Signal interference prevention may be provided by an echo cancellation unit, by lower limiting the local party's bandwidth to about 300 Hz with a high pass filter or by muting the microphone of the local party's telephone when a specific pulse is detected by the energy detector. In addition, the apparatus includes means for un-muting the local party's telephone if sound is detected during the second predetermined period, the un-muting of which permits the local and remote parties to converse.

The accurate detection of an attempted three-way call is complicated if one or both of the parties on the line has "call waiting" service. In the case of an inmate call, the called party is typically notified prior to call acceptance that the call will be terminated if the called party either attempts to make a three-way conference call or accepts a call waiting call. This is so, because the called party can use call waiting to relay a conversation back and forth between the inmate and the third party. However, the fact that a call waiting notification is generated on the line, indicating that a third-party is attempting to also call the called party, should not cause call termination. Call waiting notification may be "accepted" or "ignored." Acceptance of the third-party call by the called party's activation of the hook-flash should, however, be detected and result in call termination. The apparatus of the present invention can detect such acceptance while distinguishing the call waiting "notification" signal.

Figure 4B:
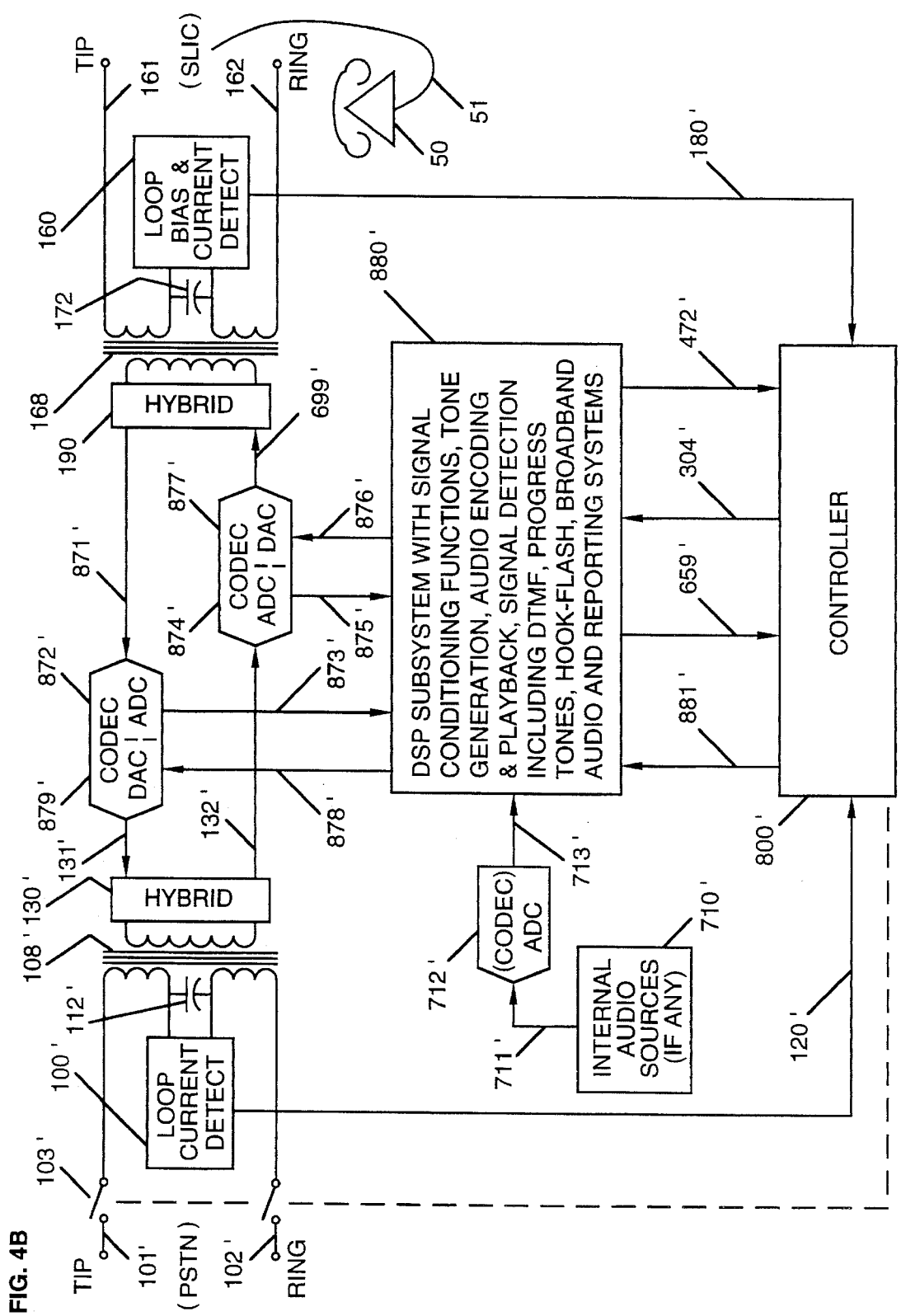

FIG. 4B shows the apparatus of the present invention as connected to an otherwise independent loop-start telephone or piece of telephone equipment by being placed electrically between the serving central office and the independent telephone or piece of telephone equipment. The indicated loop start circuits could easily be replaced by ground-start circuits by one skilled in the art. FIG. 12A indicates the relative placement of the present invention in such a case.

Comparing FIG. 4B with FIG. 4A, it is apparent that the only change to the overall circuit is to provide the circuitry necessary to disassociate the present invention from the controlled telephone equipment. This is accomplished by providing a loop bias ("talk battery") voltage and external telephone equipment off-hook detection circuits depicted as block 160. As the signals 871 and 699 are unidirectional, a second hybrid function 190 is provided to convert the unidirectional, i.e., four wire, signals to the two wire bi-directional form. Isolation is provided by transformer 168. AC audio circuit completion is provided by capacitor 172. The DC bias voltage is provided by the loop bias block 160. Block 160 also contains appropriate loop current detection in a manner similar to block 100. The resulting subscriber line interface circuit ("SLIC") looks exactly like a standard Telco central office TIP/RING pair and is designated by leads 161, 162. Any standard telephone interface equipment can be connected to the TIP/RING pair 161, 162 as shown by the telephone instrument 50 via telephone line 51.

When the telephone equipment 50 goes off hook, the loop current detector 160 will sense the occurrence and report to the controller via signal 180 exactly as in FIG. 4A.

Figure 4C:
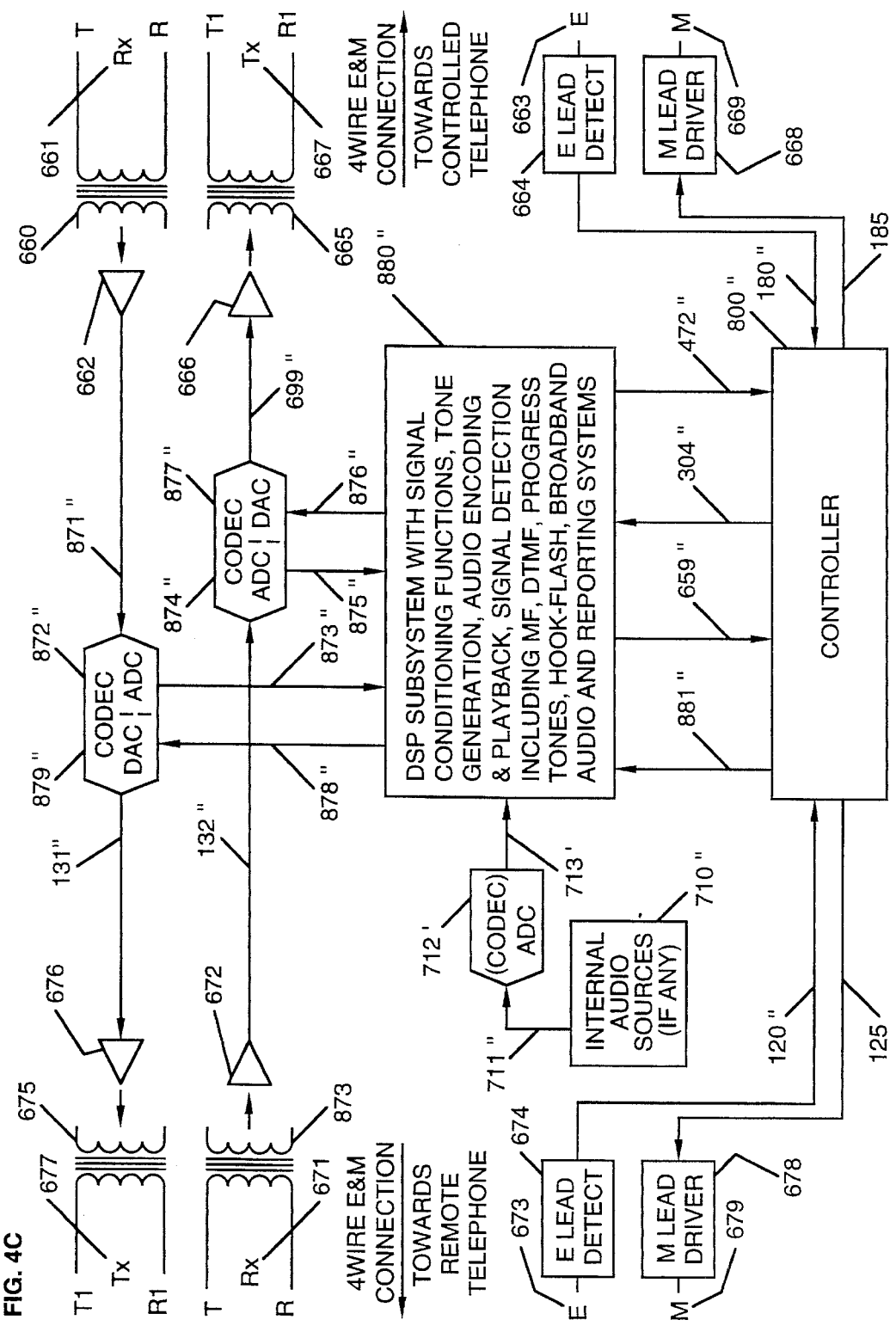

FIG. 4C pertains to a stand alone piece of telephone equipment using industry standard four wire plus E&M ("4E&M") analog interconnections intended to be connected within the PSTN. In this case, the present invention would not be connected directly to the telephone or telephone equipment receiving the control benefits of the present invention. Instead, it would be connected either between two switches (FIG. 12B) or as an adjunct to a switch (FIGS. 12C and 12D).

In the case shown in FIG. 4C, there are no loop current detectors or hybrid functions. In 4E&M circuits, the audio paths are always connected but not necessarily active. The equivalent to the controlled telephone going off-hook is when the E-lead 663 from the PSTN circuit providing the E-lead signal is activated. The equivalent signal is now called a "service request" but is, in effect, the same as the controlled telephone equipment going off hook. The controlled telephone equipment E-lead is monitored by E-lead detector 664 and reported to the controller 800 as signal 180. Numerous circuits are known in the art, such as, isolation relays, transistor level shifters and, similar to loop current detectors, simple optoisolator circuits.

The controller 800 has the additional task in this network application of responding to the requesting PSTN switch with appropriate "winks" and "off hook" conditions on the M-lead. This is accomplished via signal 185 connected to an M-lead driver 668 which in turn commonly drives a mercury wetted relay as the actual M-lead signal. Other M-lead signal driving circuits are known in the art.

On the monitored telephone equipment side, a similar set of connections are disclosed. Instead of driving relay 103 as in FIG. 4A the monitored telephone equipment network switch is notified that service is requested by asserting signal 125 to the monitored side M-lead driver 678 which in turn drives the monitored side M-lead 679. Instead of waiting for a dialtone as in FIG. 4A and 4B, it is necessary to wait only for the monitored side switch to indicate service acceptance by the use of its E-lead signal 73. This is detected by the E-lead detector 674 and reported to the controller 800 via signal 120. In all other respects, the circuits described in FIG. 4C act in a manner similar to those in FIGS. 4A and 4B.

Figure 4D:
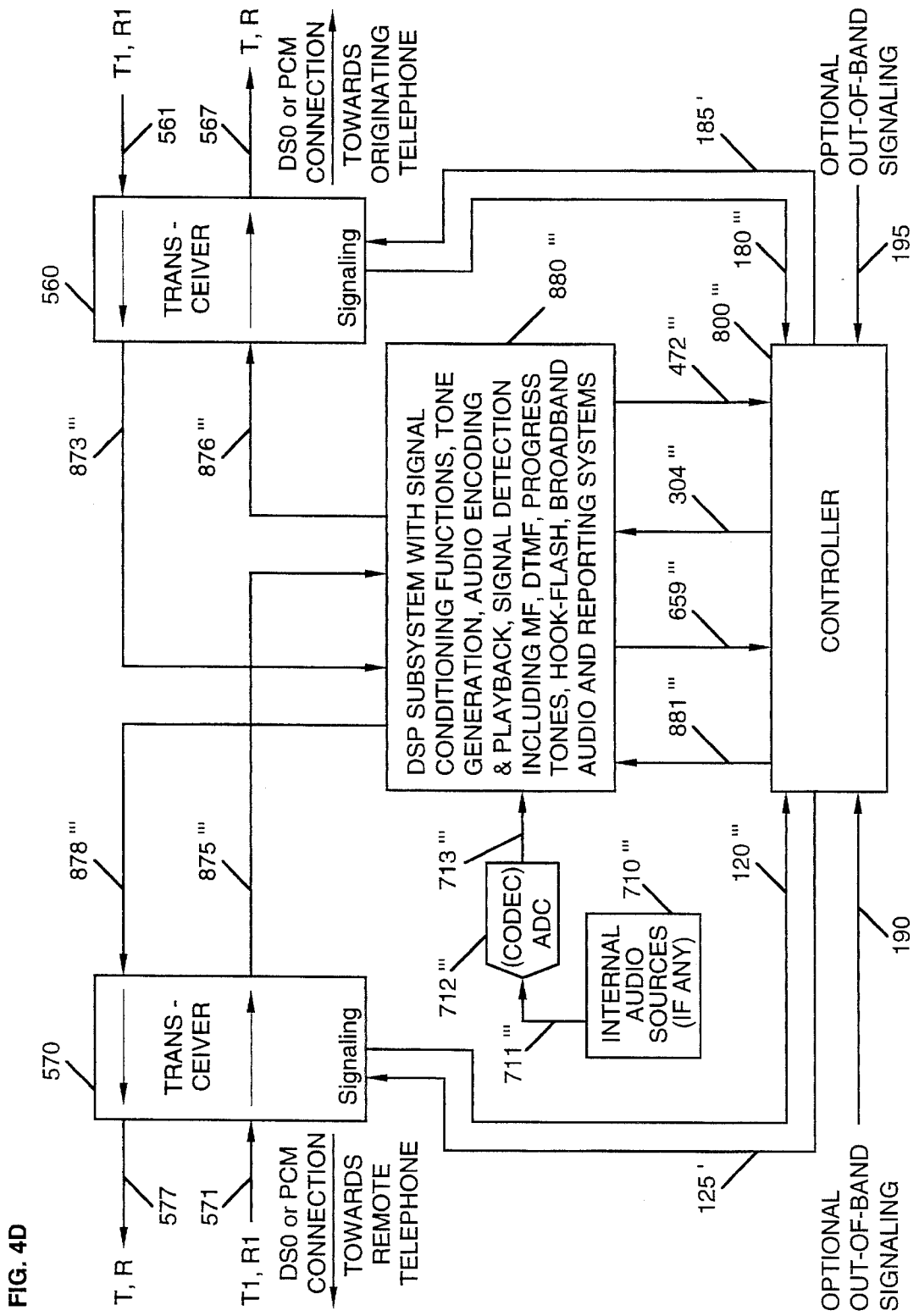
Figure 5:
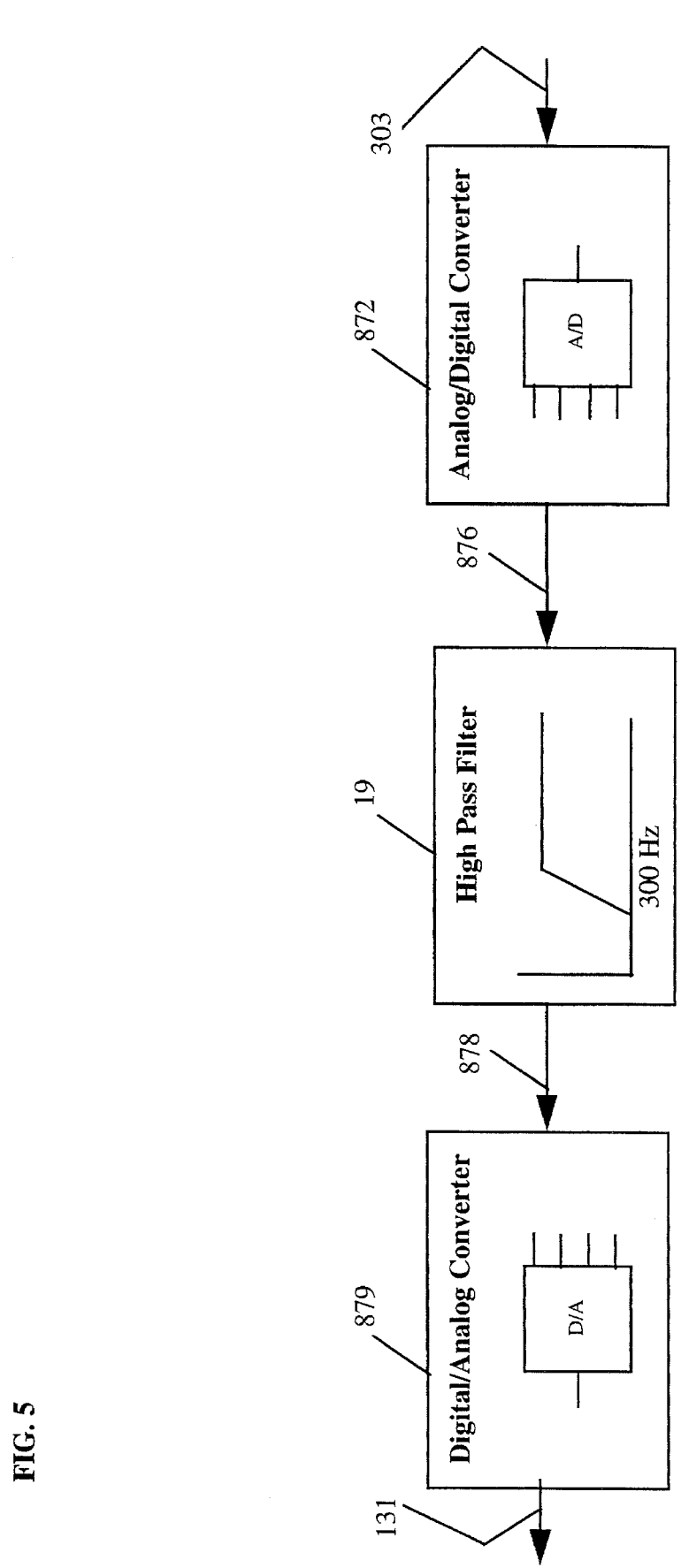
FIG. 5 illustrates the features of a high pass filter as implemented with a DSP algorithm.

FIG. 4D is a block diagram which shows the general organization of the equipment of the present invention where the signals transmitted and received on the line are already digitized. This occurs, for example, where the detection equipment is located in the network as part of the transmission of a call which has already been digitized.

In this case, the present invention would not be connected directly to the telephone or telephone equipment receiving the control benefits of the present invention but rather either between two switches (FIG. 12B) or as an adjunct to a switch (FIGS. 12C and 12D).

The standard practice is currently to digitize the telephone audio signals at the LEC end office before transmission in digital form to another intra-LATA end office or to an inter exchange carrier for transmission to an inter-LATA end office. Each audio path equivalent is referred to as a trunk and the digitized trunk is referred to as a "DSØ" level signal. Multiple DSØ signals may be multiplexed over a single physical path, for example, DS1 and DS3 level paths, which are the normal signal connection levels to and from the LEC and/or IXC. For purposes of the present invention the DSP subsystem is described as an individual subsystem for each DSØ trunk. It may be clear to those normally skilled in the art that a DSP subsystem with sufficient speed (digital bandwidth) could directly handle multiple DSØ trunks by appropriately partitioning memory and processing time.

Because the signal is digital form, it is not necessary to have analog to digital converters 872 and 874 shown in FIGS. 4A–4C. Instead, in the embodiment shown in FIG. 4D, there is a single analog to digital converter 712 which is used solely to convert internal audio sources 710, if any, such as tones or recorded messages, such as those that might be initiated by controller 800, if a three-way call is confirmed.

In the case shown in FIG. 4D, there are no loop current detectors or hybrid functions. In DSØ circuits, the audio paths are always connected but not necessarily active. The equivalent to the controlled telephone going off hook is, in the case of in-band or robbed bit signalling, when the A-bit as part of signal 561 from the controlled telephone equipment PSTN is activated. The equivalent signal is now called a "service request" but is, in effect, the same as the controlled telephone equipment going off hook. The controlled telephone equipment service request A-bit is monitored by the indicated transceiver 560. This transceiver may be a combination of available circuits from, for example, Crystal Semiconductor Corporation, Austin, Tex., or may be implemented in a field programmable gate array such as available from Xilinx, Inc., San Jose, Calif. This A-bit signal is handled exactly as the E-lead in FIG. 4C. The signal equivalent to the M-lead is an outgoing or return A-bit sent by the controller 800 as signal 185 which is inserted into the PCM signal 567.

Similarly, the in-band or robbed bit service request from the present invention would be sent from the controller 800 as signal 125 which transceiver 570 inserts into the PCM bit stream 577 in the same manner as the other transceiver. The outgoing service acceptance will be sent by the PSTN receiving switch as the A-bit in PCM signal 571 which, in turn, is decoded by transceiver 570 and sent to controller 800 as signal 120.

An option to the in-band or robbed bit signals is the use of out-of-band signalling as in the case of SS7 or ISDN implementations. In this case the transceivers 560, 570 are primarily PCM buffers and the service request and acceptance signals are provided on the signal 195 from the controlled telephone equipment end and on signal 190 from the monitored telephone equipment end.

C. OVERALL SYSTEM OPERATION:

FIGS. 6–11 provide a combination of routines describing the processes needed to identify and appropriately respond to the signals and events related to (typically computer) controlled calls, collect calls and potential fraudulent abuses of calls, collect or not, caused by certain classes of telephone users. The software flow charts provided, portions thereof, or functional equivalents, would commonly be incorporated as part of a comprehensive telephone control program.

Figure 6:
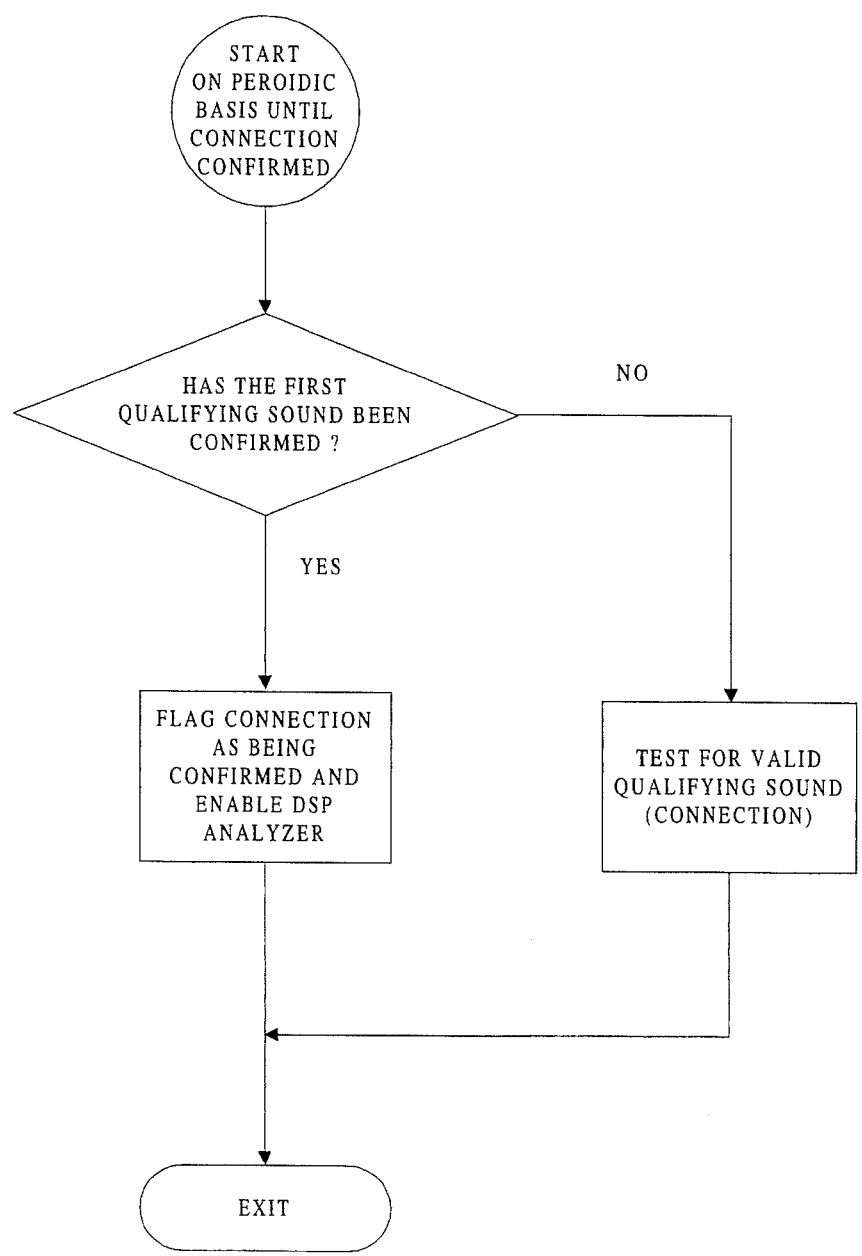
FIG. 6 is a software flow diagram of the present invention for implementing valid call set-up confirmation.

The call completion algorithm, disclosed in FIG. 6, is used to determine when the calling party's circuit to the called party's telephone, known as "call completion" or possibly to a busy indicator or other Telco intercept circuit, so that signal analysis is not performed on network switching noises prior to call completion.

Figure 7:
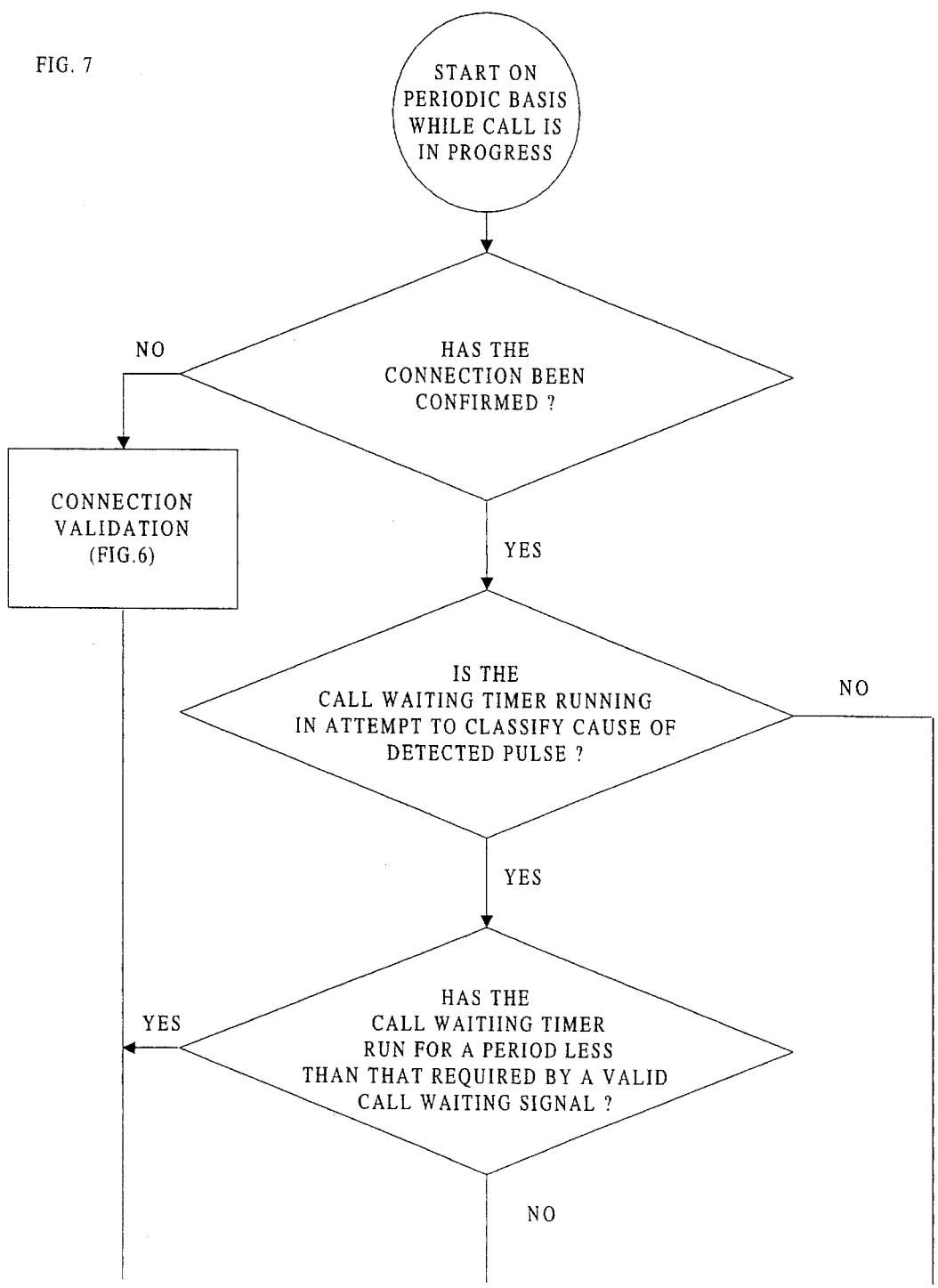
Figure 7B:
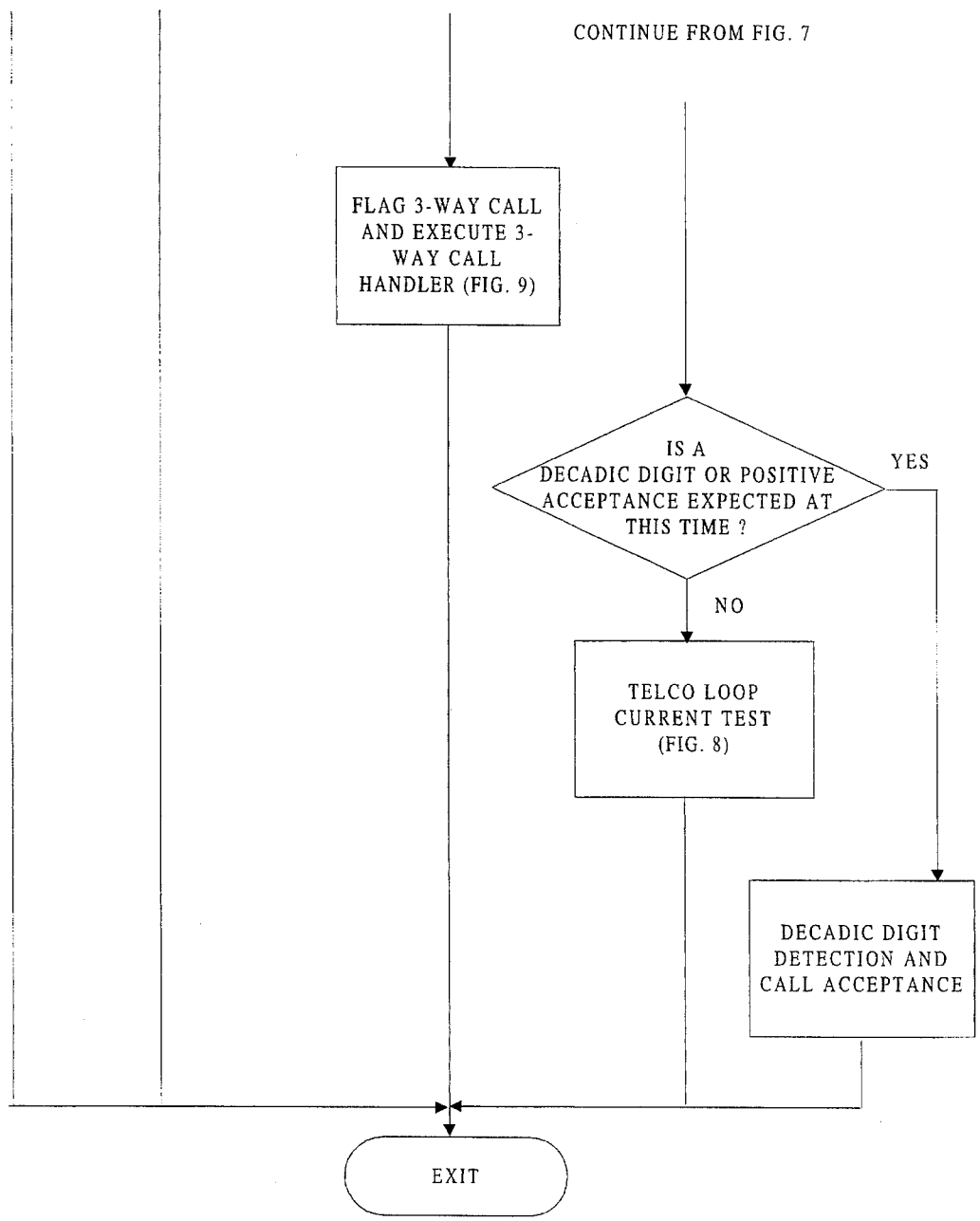
Figure 8:
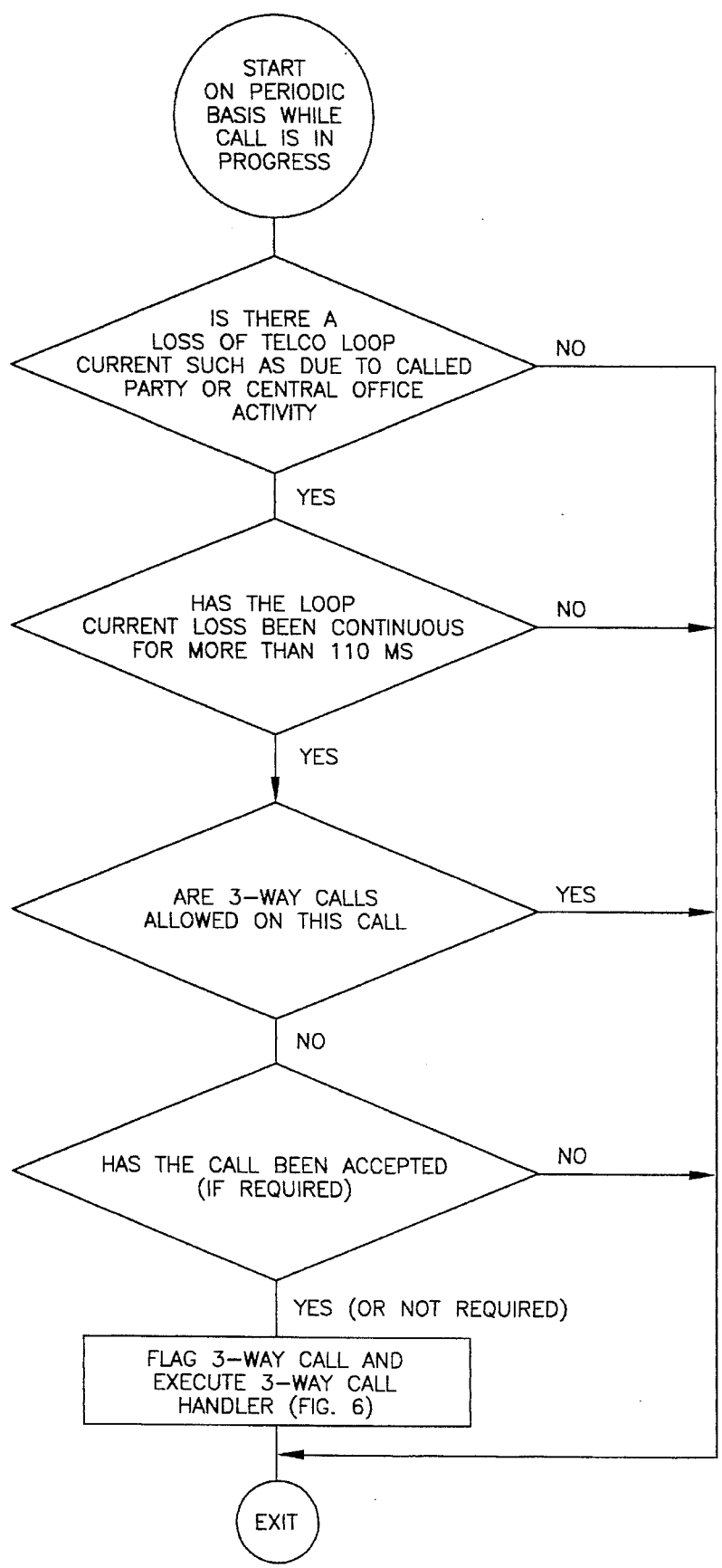
FIG. 8 is a software flow diagram of the present invention for determining if telephone company (i.e., "Telco") loop current interruptions are called party hook-flash or on-hook sequences when used in a telephone ("CPE") implementation, i.e., an on-site/non-network configuration.
Figure 9:
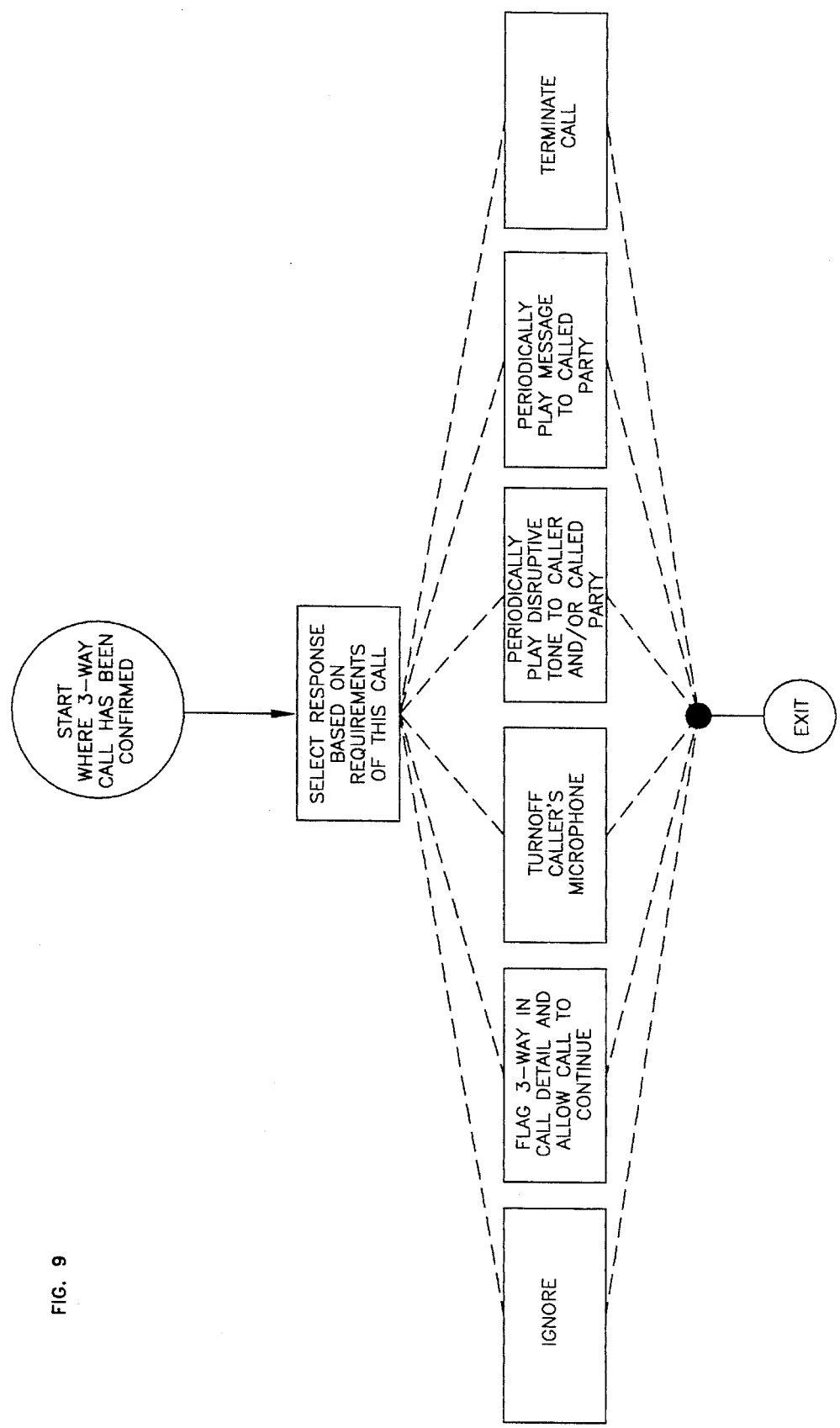
FIG. 9 is a software flow diagram of the present invention for responding to detected three-way calls.
Figure 10:
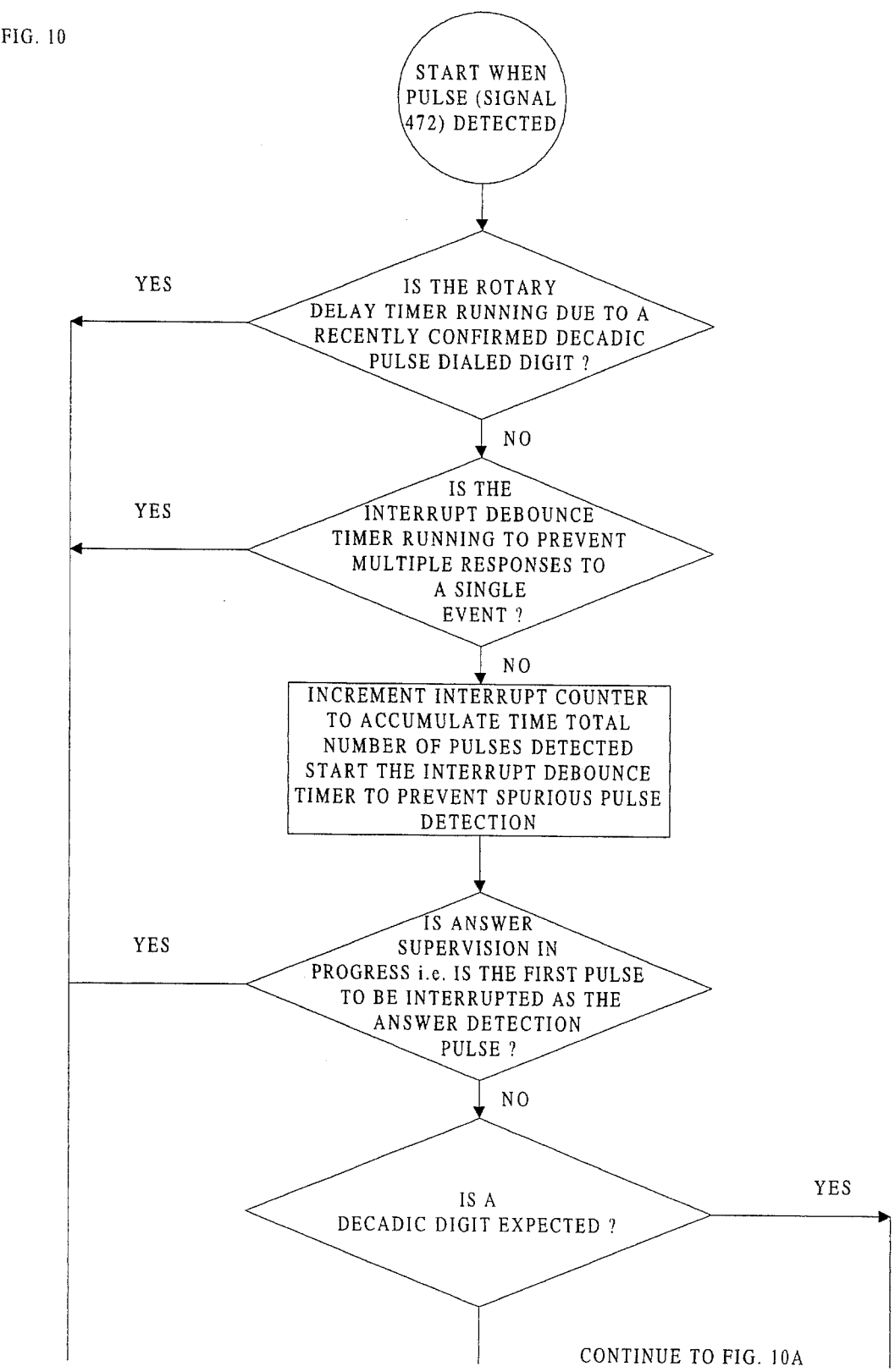
FIG. 10 and 10a are a software flow diagram of the present invention for responding to signals detected by the DSP subsystem possibly being caused by called party pulse-dialing or hook-switch activation.
Figure 10A:
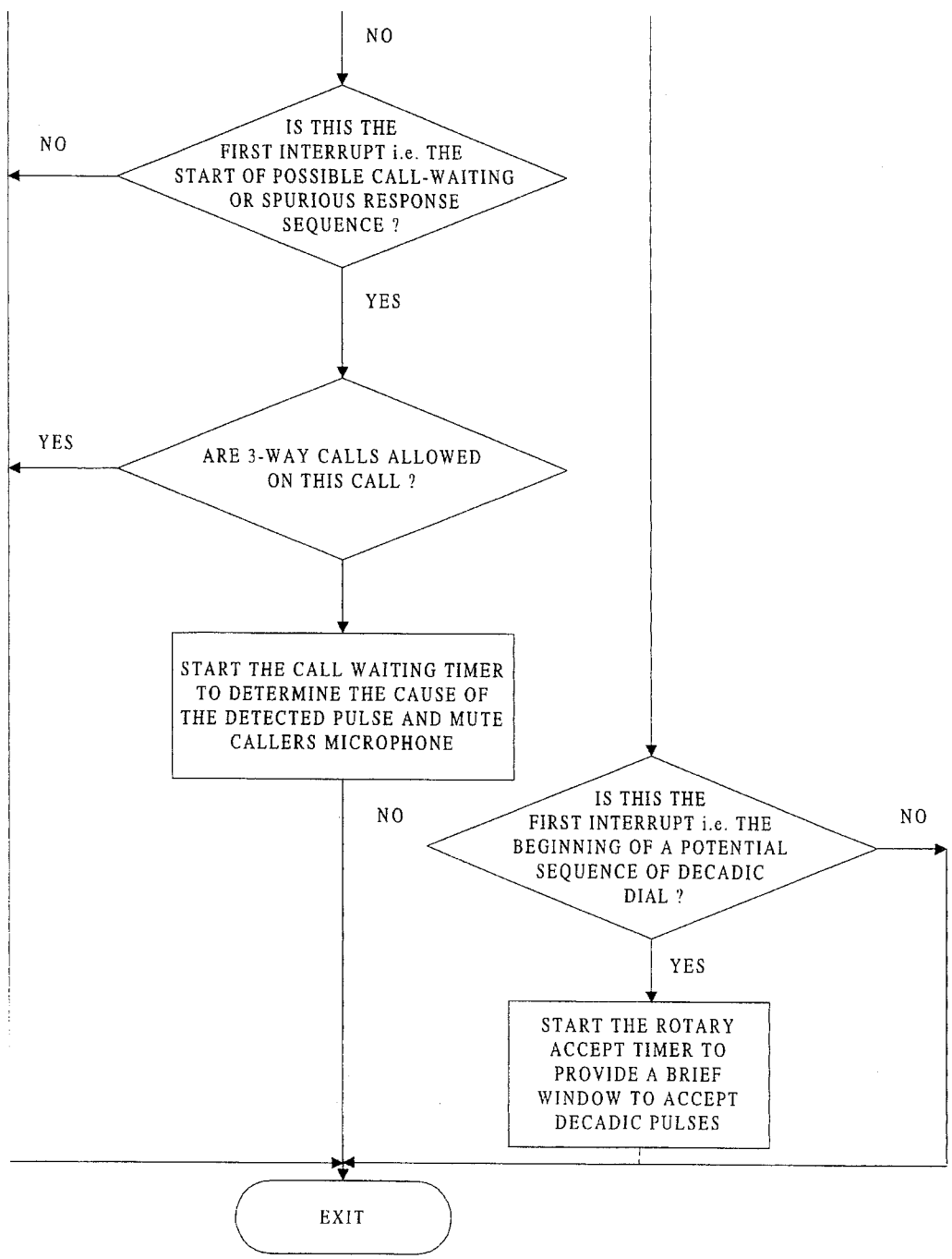

The signal classification algorithm, disclosed in FIG. 7, is an example of a top level software structure that, along with structures similar to FIGS. 6 and 8–11, or relevant portions thereof, would be added to the control program for a telephone system wishing to incorporate features of the present invention. The algorithms depicted in FIGS. 6–9 and 11 are presented in a manner consistent with a control program based on periodic execution of its primary control algorithms. FIG. 10 is presented in a manner consistent with an interrupt to the periodic control program being initiated in response to signal 472. A suitably modified version of any or all of FIGS. 6–11 may be readily incorporated in control programs using structures other than a periodic and interrupt structure.

The algorithm described in FIG. 7 is presented assuming a limited access telephone application which may be used in a prison inmate telephone system requiring call and/or collect call acceptance and optionally disallowing three-way conference calls.

The algorithm described in FIG. 7 provides control for the functions of call completion, call, or collect call, acceptance by the called party, detection of loop current loss if the called party is served by the same central office as the calling telephone system, protection against undesirable disconnection due to inadvertent system response to signals similar to those associated with three-way conference calling, and the second means for confirming an attempt to initiate a three-way call, i.e., window analyzation.

The window analyzation algorithm presented in FIG. 7 determines if a pulse detected by Block 880 has been caused by some occurrence other than a three-way call setup request by the called party. Causes other than a three-way call setup request have audible sounds, including voice or tone signals, detectable by Block 880. If any of these indicators are present for about 40 milliseconds or more, with 200 milliseconds virtually guarantying voice, shortly after detection of a pulse by Block 880, preferably within about 2.7 seconds, (of which about 1.4 seconds is to ignore call-waiting signals and 1.3 seconds is to accept called party sounds) the pulse was probably not caused by a three-way call attempt. For end-of-call-only detection where three-way calls are not of any concern, the second period may be extended to about 10 to 60 seconds to reduce inadvertent disconnections.

The Telco local loop current test algorithm, disclosed in FIG. 8, is an example of one method of detecting and responding to the loss of the telephone company loop current that often occurs when the calling party equipment and called party equipment share a common central office.

The three-way call handler or response means, disclosed in FIG. 9, provides an example of some methods of dealing with an attempt by the called party to provide the calling party with three-way call access to a third party when this activity is prohibited by the institution or circumstances involved with the specific call in question.

The detected pulse handler, disclosed in FIG. 10, provides a means of communicating the detection of a pulse by Block 880, to the algorithms of FIGS. 6–9 and 11. The algorithm of FIG. 10 is presented in the form of a hardware interrupt response by the controlling program in Block 800.

The algorithm of FIG. 10 provides the function of restricting multiple responses to original signals that were of a singular nature (referred to as debouncing of signal 472). Further, the algorithm of FIG. 10 provides the function of counting the debounced pulses detected by Block 880. Further, the algorithm of FIG. 10 provides the function of starting a sequence of protective measures in an attempt to classify a detected pulse.

Figure 11:
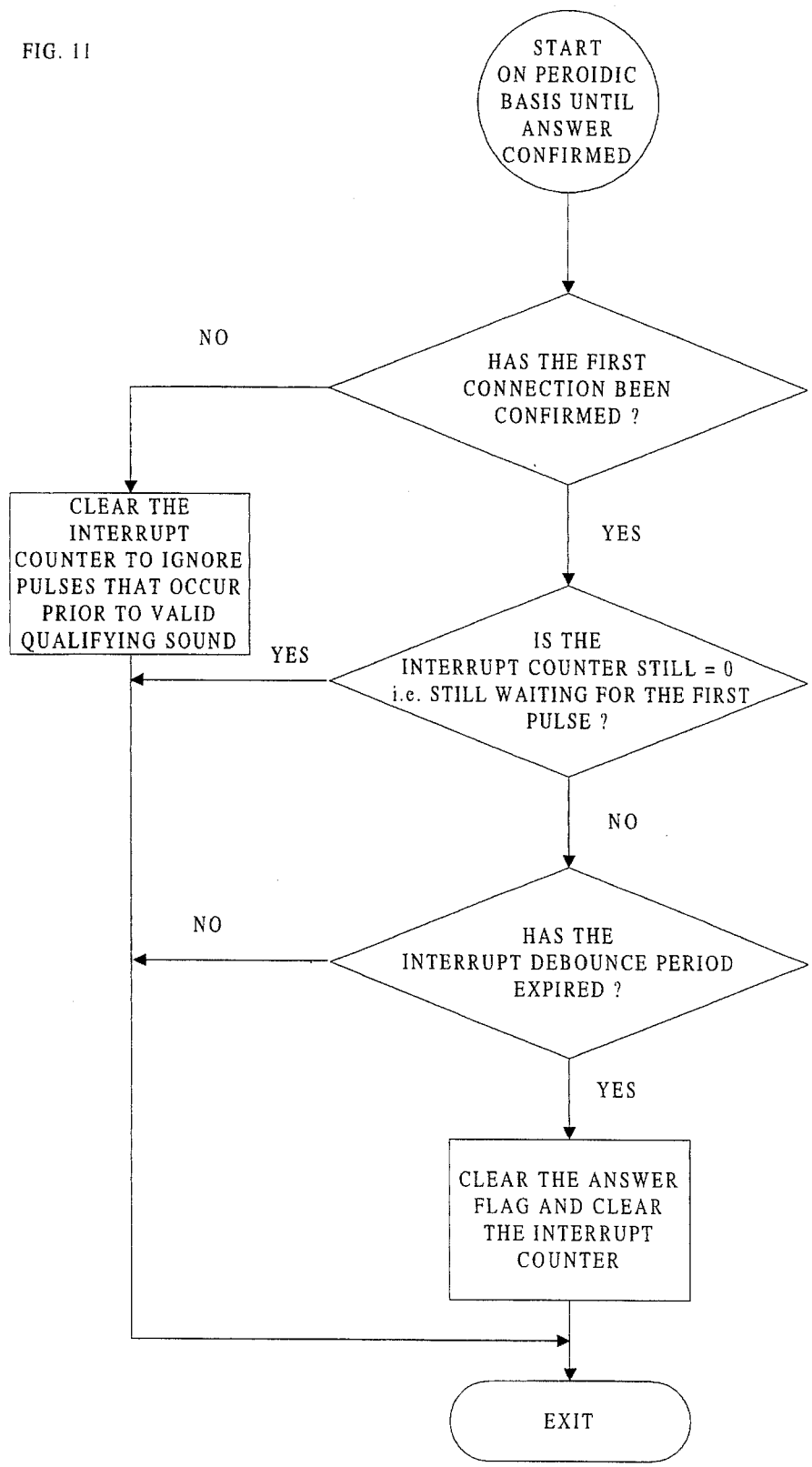
FIG. 11 is a software flow diagram of the present invention for detecting called party answer.

The pulse assisted answer supervision algorithm, disclosed in FIG. 11, is an example of one method of providing a telephone, or related system, with the ability to recognize the moment, i.e. exactly, when the called party answers their telephone. This is important on many computerized or otherwise automated telephone systems where the duration of the call is used to determine charges for the call or where automated voice systems communicate with the called party.

By following the flow charts in FIGS. 6–11, for each of the conditions mentioned previously, the reader will understand how the apparatus of the present invention determines the cause of and response to one or more signals on lines 120 and 472, indicating for example, call answer, call acceptance, call waiting notification, and the detection of and optional response to a detected (potentially fraudulent) three-way conference call or acceptance of (transfer to) an incoming call waiting by this called party.

D. NETWORK EMBODIMENT:

As noted briefly above, the apparatus of the present invention may be utilized in a number of different environments. For example, (1) it may be located in or in connection with an individual telephone, (2) it may be utilized at or in connection with the phone system of an institution, such as, a prison, hotel, or hospital, or (3) it may be deployed in a network. Several embodiments are depicted in FIGS. 12A through 12D.

FIG. 12A depicts a system in which the equipment for detecting the hook-flash is associated with one or more telephones at a particular institution. The methods by which the equipment can be connected with those phones are as shown in related FIGS. 4A and 4B. In FIG. 12A, the phone is connected to the three-way call apparatus, i.e., "detector," 60 of the present invention located in the line between the local telephone and the local central office 70 which completes the call to remote phone 42. The FIG. 12A embodiment represents a configuration in which the detector is located between the calling party's telephone and the end office, LEC, or switch. In this configuration, the detector may monitor the initiation of a three-way call, regardless of whether the remote telephone on which such an attempt is made is connected either locally or by long distance.

Figure 12B:
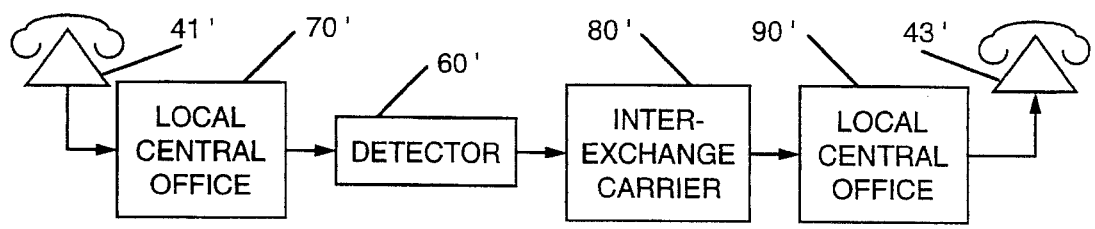
Figure 12C:
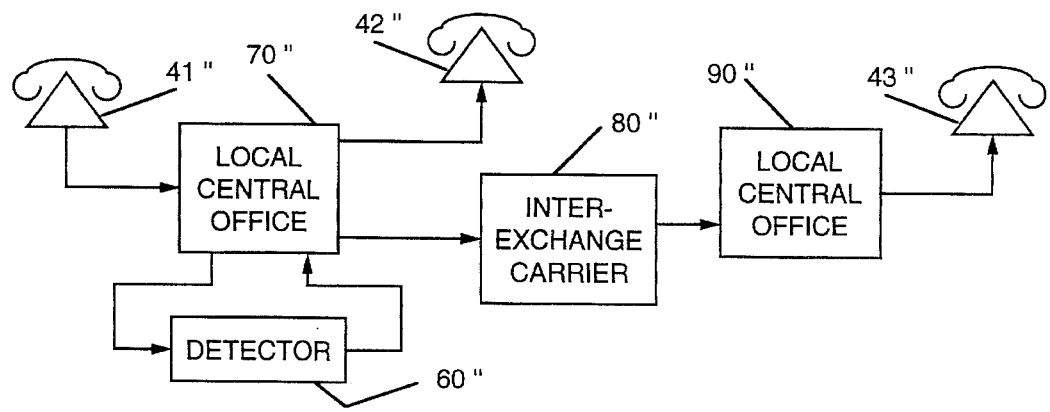
Figure 12D:
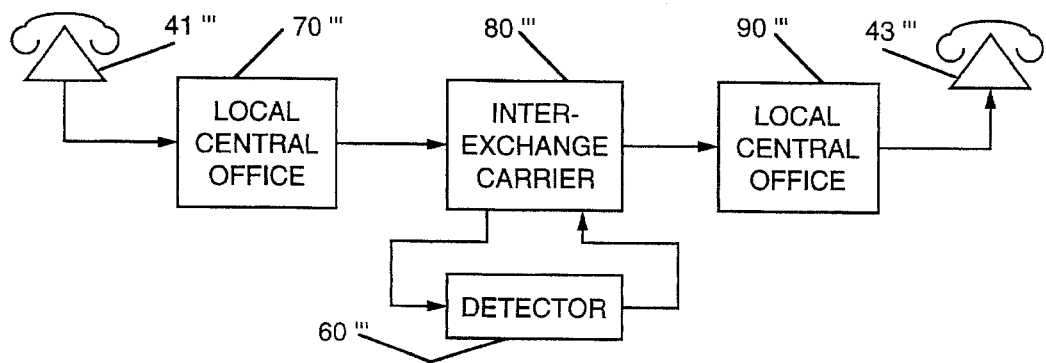

FIG. 12B figuratively depicts a system configuration in which the detection equipment 60 is located between the local office 70 and an inter-exchange carrier ("IXC") 80 which connects the call to remote local central office 90. In this arrangement, the detection equipment 60 can monitor hook-flash signals of a called party on a long distance call between local telephone 41 and remote telephone 43.

FIG. 12C figuratively depicts a system configuration in which the detection equipment 60 is located in connection with the local end office 70 and selectively connected into the path to telephone 42 or the IXC 80. In this arrangement, the detection equipment is capable of monitoring hook-flash signals of a called party on a long distance call between local telephone 41 and remote phone 43 through local central office 70, IXC 80 and remote local central office 90 or a local call between telephone 41 and telephone 42.

FIG. 12D depicts an arrangement in which the detector 60 is located at the IXC 80, and selectively connected into the call path towards telephone 43. This arrangement permits selected long-distance calls to be monitored for attempts to initiate a three-way call.

FIGS. 12B, 12C and 12D are examples of detection equipment deployed in a network configuration. As previously indicated, the term "network," as used herein, refers to any system in which the detection equipment is connected in the telephone connection between the local and remote telephone at some point after the call reaches the initial switch, at the central office, LEC, etc. Network configurations, other than those specifically depicted, can be designed for particular applications.

Because it may not be necessary to monitor all calls, but only those emanating from a particular source, e.g., a prison, calls may be selectively routed to the detection equipment by the LEC. This may be done, for example, by using a combination of automatic number identification ("ANI") information which the telephone system automatically supplies in connection with a call identifying the calling telephone, "II digits" which identify a class of service or type of telephone, and/or the called telephone number, all of which should be available to the LEC. This information can be analyzed and used to determine which incoming calls should be sent to the detection equipment for line monitoring.

Whether or not the detection equipment is located prior to the switch or is in a network environment, as defined herein, the detection equipment hears essentially the same signal as that received by the telephone equipment not attempting to initiate the three-way conference call. In other words, the energy received by the apparatus has essentially the same characteristics as that received by the other party to the call.

In that regard, it should be noted that the use of the terms "local" and "remote" with respect to particular telephones or "called" and "calling" party, as used herein, are not intended to limit the invention in any way, other than to illustrate specific embodiments or to assist in defining the location of the apparatus of the invention with respect to other pieces of equipment. In fact, the apparatus of this invention may be connected to any telecommunication between two parties in which one of the parties has three-way call conferencing capability. Because of the present needs of commercial users, e.g. prisons, emphasis has been placed herein on the use of the invention to detect attempts to initiate three-way calls by the called party. The invention, could also be applied to detect three-way calls which the calling party attempts to initiate with a hook-flash, so long as that is the signal which is being monitored.

Similarly, it should be understood that reference to the apparatus of this invention being "connected" to a telecommunication includes any configuration in which the apparatus of this invention is capable of monitoring the desired signal and responding in the desired manner, if the attempted initiation of a three-way call through a hook-flash is detected.

E. OTHER FUNCTIONS:

Those skilled in the art will appreciate that while the present invention has been described as being useful for detecting an attempted three-way call initiated by a hook-flash signal, any event which causes the generation of the hook-flash or hook-flash like signal such as a call waiting signal, call answering, call termination, and determining the specific number dialed number on a rotary/pulse telephone, can also be detected. Accordingly, the detection of such other events is considered to be within the scope of the present invention.

For example, the invention provides an apparatus for detecting the called party's answering of the call. This embodiment also includes signal interference prevention means for preventing signals originating at the calling party's telephone from interfering with signals originating at the called party's telephone.

Again, signal interference can be prevented by muting the calling party's microphone or with echo cancellation. In addition, a ringback detector (ringback detection means) is provided for detecting the called party's ringback signal energy level. Also provided is a low pass filter for passing energy having frequencies below about 500 Hz and energy detection means for detecting a specific electrical energy pulse having been filtered by said filter means and having a predetermined minimum magnitude which is caused when a called (remote) party goes off-hook, i.e., removes the telephone's handset from the telephone's hookswitch. In addition, this apparatus includes means for activating the energy detector when the ringback signal is detected.

Those skilled in the art will appreciate that called party answer is indicated when the first specific energy pulse is detected after the apparatus has detected the called party's ringback signal. If the signal interference prevention means includes calling party microphone muting means, means for un-muting the microphone of the calling party's telephone must be provided when a specific pulse is detected so that the calling party may converse with the called party. This embodiment of the invention is useful where the calling party telephone is a pay telephone of a type wherein charges are based upon the length of the call. This apparatus can be used in conjunction with the end-of-call-supervision apparatus as described in the '702 Patent, to provide an accurate way of determining the length of a telephone call for billing purposes.

The invention has been described in detail with reference to particular embodiments thereof, but it will be understood that various other modifications can be effected within the spirit and scope of this invention.

We claim:

1. An apparatus connected to a telecommunication between a local telephone in telecommunication with a remote telephone, wherein one of said telephones has a three-way calling service which is not associated with the apparatus, which apparatus is capable of determining whether the party using the telephone with three-way calling service has performed a specific act that is consistent with an attempt to initiate a three-way call utilizing a hook-flash signal comprising:

means for the detection of an energy pulse generated by the telephone having the three-way calling service, said pulse having a frequency characteristic of the hook-flash signal;

first means for confirming the existence of the hook-flash by analyzing the energy pulse to determine if there is a rapid drop-off in energy which is a further characteristic of the hook-flash signal; and response means for implementing a predetermined response when said energy pulse is detected and confirmed.

2. The apparatus according to claim 1 in which the apparatus is connected in the telecommunication at a point between the local telephone and the first switch in the local exchange.

3. The apparatus according to claim 2 in which the first means for confirming the hook-flash comprises digital signal processing means for analyzing the energy pulse to determine if there is a rapid drop-off in energy which is a further characteristic of the hook-flash signal.

4. The apparatus according to claim 2 in which the means for detecting and the means for confirming the hook flash comprises:

means for filtering the energy to a bandwidth less than approximately 500 Hz;

means for calculating the absolute value of the hook flash signal;

means for calculating the moving average of the signal;

means for determining whether the signal is greater than a predetermined minimum; and means for determining whether there is a rapid drop off in the energy of the signal, if the energy of the signal is greater than the predetermined minimum, by comparing a current sample of the signal to a previous sample of the signal.

5. The apparatus according to claim 4 further comprising second means for confirming the existence of the hook-flash by window analyzation.

6. The apparatus according to claim 4 in which the means for the detection of an energy pulse generated by the telephone having the three-way calling service includes low pass filtering means for passing energy having a frequency between approximately 100 and 300 Hz.

7. The apparatus according to claim 4 in which the low pass filtering means is accomplished with digital signal processing.

8. The apparatus according to claim 4 in which the means for detecting and the first means for confirming are digital signal processing means.

9. The apparatus according to claim 8 in which the digital signal processing means analyzes the signal at a rate of once every 39 mS.

10. The apparatus according to claim 9 in which the rapid drop-off in energy is characterized by having an effective slope of approximately 0.05 to 0.17.

11. The apparatus according to claim 9 in which the rapid drop-off in energy is characterized by having an effective slope of approximately 0.078.

12. The apparatus according to claim 8 further comprising second means for confirming the existence of the hook-flash signal by window analyzation.

13. The apparatus according to claim 12 in which said window analyzation means includes:

timer means for cooperating with said energy detection means so that said timer means begins running for a first pre-determined time period when a specific energy pulse is detected and confirmed by said first confirmation means;

sound detection means for detecting sound during the telecommunication and for cooperating with said timer means so that said sound detection means is activated at the end of the first predetermined period for a second predetermined maximum time period; and means for activating the response means if sound is undetected during the second predetermined period, the undetection of which provides an indication that the remote party has performed a specific act that is consistent with an attempt to initiate a three-way call.

14. The apparatus according to claim 13 further including means for echo cancellation or for muting the sound from the telephone other than the one which has three-way call services associated with it during the second predetermined period.

15. The apparatus according to claim 4 in which the response means includes means for implementing at least one predetermined response selected from the group consisting of:
   means for terminating the telecommunication between the local and remote parties;
   means for playing a pre-recorded message;
   means for generating a tone which is heard by one or more parties to the telecommunication;
   means for muting the local telephone; and
   means for recording the date and time of the attempt to initiate the three-way call.

16. The apparatus according to claim 4 in which the response means comprises means for terminating the telecommunication between the local and remote parties.

17. The apparatus according to claim 1 in which the apparatus is connected in the telecommunication at a point in the network after the telecommunication from the local telephone reaches the initial switch at the local exchange.

18. The apparatus according to claim 17 in which the first means for confirming the hook-flash comprises digital signal processing means for analyzing the energy pulse to determine if there is a rapid drop-off in energy which is a further characteristic of the hook-flash signal.

19. The apparatus according to claim 17 in which the means for detecting and the means for confirming the hook flash comprises:
   means for filtering the energy to a bandwidth less than approximately 500 Hz;
   means for calculating the absolute value of the hook flash signal;
   means for calculating the moving average of the signal;
   means for determining whether the signal is greater than a predetermined minimum; and
   means for determining whether there is a rapid drop off in the energy of the signal, if the energy of the signal is greater than the predetermined minimum, by comparing a current sample of the signal to a previous sample of the signal.

20. The apparatus according to claim 19 further comprising second means for confirming the existence of the hook-flash by window analyzation.

21. The apparatus according to claim 19 in which the means for the detection of an energy pulse generated by the telephone having the three-way calling service includes low pass filtering means for passing energy having a frequency between approximately 100 and 300 Hz.

22. The apparatus according to claim 19 in which the low pass filtering means is accomplished with digital signal processing.

23. The apparatus according to claim 19 in which the means for detecting and the first means for confirming are digital signal processing means.

24. The apparatus according to claim 19 in which the digital signal processing means analyzes the signal at a rate of once every 39 mS.

25. The apparatus according to claim 24 in which the rapid drop-off in energy is characterized by having an effective slope of approximately 0.05 to 0.17.

26. The apparatus according to claim 24 in which the rapid drop-off in energy is characterized by having an effective slope of approximately 0.078.

27. The apparatus according to claim 23 further comprising second means for confirming the existence of the hook-flash signal by window analyzation.

28. The apparatus according to claim 27 in which said window analyzation means includes:
   timer means for cooperating with said energy detection means so that said timer means begins running for a first pre-determined time period when a specific energy pulse is detected and confirmed by said first confirmation means;
   sound detection means for detecting sound during the telecommunication and for cooperating with said timer means so that said sound detection means is activated at the end of the first predetermined period for a second predetermined maximum time period; and
   means for activating the response means if sound is undetected during the second predetermined period, the undetection of which provides an indication that the remote party has performed a specific act that is consistent with an attempt to initiate a three-way call.

29. The apparatus according to claim 28 further including means for echo cancellation or for muting the sound from the telephone other than the one which has three-way call services associated with it during the second predetermined period.

30. The apparatus according to claim 19 in which the response means includes means for implementing at least one predetermined response selected from the group consisting of:
   means for terminating the telecommunication between the local and remote parties;
   means for playing a pre-recorded message;
   means for generating a tone which is heard by one or more parties to the telecommunication;
   means for muting the local telephone; and
   means for recording the date and time of the attempt to initiate the three-way call.

31. The apparatus according to claim 19 in which the response means comprises means for terminating the telecommunication between the local and remote parties.

32. An apparatus connected to a telecommunication between a local telephone in telecommunication with a remote telephone, said connection being made at a point in the network after the telecommunication from the local telephone reaches the initial switch at the local exchange, wherein one of said telephones has a three-way calling service which is not associated with the apparatus, which apparatus is capable of determining whether a party using the telephone with the three-way calling service has performed a specific act that is consistent with an attempt to initiate a three-way call utilizing a hook-flash signal comprising:
   low pass filtering means for passing energy having a frequency less than about 500 Hz;
   means for the detection of an energy pulse generated by the telephone having the three-way calling service having a frequency less than about 500 Hz and above a pre-determined threshold which is characteristic of the hook-flash signal;
   first means for confirming the existence of the hook-flash by analyzing the energy pulse to determine if there is a rapid drop-off in energy of the pulse which is a further characteristic of the hook-flash signal;
   second means for confirming the existence of the hook-flash by window analyzation; and response means for implementing a predetermined response when said energy pulse is detected and confirmed by said first and said second means for confirming.

33. The apparatus according to claim 32 in which the low pass filtering means passes energy having a frequency between approximately 100 and 300 Hz.

34. The apparatus according to claim 32 in which the low pass filtering means passes energy having a frequency between approximately 200 and 300 Hz.

35. The apparatus according to claim 32 in which the first means for confirming the hook-flash comprises digital signal processing means for analyzing the energy pulse to determine if there is a rapid drop-off in energy which is a further characteristic of the hook-flash signal.

36. The apparatus according claim 32 in which the means for the detection of an energy pulse characteristic of the hook-flash signal and the first means for confirming the existence of the hook-flash comprise digital signal processing:

means for calculating the absolute value of the hook flash signal;

means for calculating the moving average of the signal;

means for determining whether the signal is greater than a predetermined minimum;

means for determining whether there is a rapid drop off in the energy of the signal, if the signal is greater than the predetermined minimum, by comparing current sample of the signal to a previous sample of the signal.

37. The apparatus according to claim 36 in which the low pass filtering means is accomplished with digital signal processing.

38. The apparatus according to claim 36 in which the means for detecting and the first means for confirming comprises digital signal processing means.

39. The apparatus according to claim 38 in which the digital signal processing means analyzes the signal at a rate of once every 39 Ms.

40. The apparatus according to claim 39 in which the rapid drop-off in energy is characterized by having an effective slope of approximately 0.05 to 0.17.

41. The apparatus according to claim 39 in which the rapid drop-off in energy is characterized by having an effective slope of approximately 0.078.

42. The apparatus according to claim 36 in which said window analyzation means includes:

timer means for cooperating with said energy detection means so that said timer means begins running for a first pre-determined time period when a specific energy pulse is detected and confirmed by said first confirmation means;

sound detection means for detecting sound during the telecommunication and for cooperating with said timer means so that said sound detection means is activated at the end of the first predetermined period for a second predetermined maximum time period; and means for activating the response means if sound is undetected during the second predetermined period, the undetection of which provides an indication that the remote party has performed a specific act that is consistent with an attempt to initiate a three-way call.

43. The apparatus according to claim 42 further including means for echo cancellation or for muting the sound from the telephone other than the one which has three-way call services associated with it during the second predetermined period.

44. The apparatus according to claim 36 in which the response means includes means for implementing a predetermined response selected from the group consisting of:

means for terminating the telecommunication between the local and remote parties;

means for playing a pre-recorded message;

means for generating a tone which is heard by one or more parties to the telecommunication;

means for muting the local telephone; and means for recording the date and time of the attempt to initiate the three-way call.

45. The apparatus according to claim 36 in which the response means includes comprises means for terminating the telecommunication between the local and remote parties.

46. A method for determining whether a remote party using a remote telephone in telecommunication with local telephone equipment, wherein said remote telephone has a three-way calling service which is not associated with the apparatus, has performed a specific act that is consistent with an attempt to initiate a three-way call utilizing a hook-flash signal comprising:

detecting an energy pulse generated by the telephone having the three-way calling service, said pulse having a frequency characteristic of the hook-flash signal;

confirming the existence of the hook-flash by analyzing the energy pulse to determine if there is a rapid drop-off in energy which is a further characteristic of the hook-flash signal; and responding in a predetermined response manner when said energy pulse is detected and confirmed.

47. The method of claim 46 wherein the step of detecting energy comprises:

filtering the energy received by the local telephone equipment to a frequency range characteristic of the hook-flash signal; and detecting a specific electrical energy pulse having passed through the filter.

48. The method of claim 46 wherein the steps of detecting an energy pulse and for confirming the detection comprise:

filtering the energy pulse to pass filtered energy in a frequency range of less than approximately 500 Hz;

calculating the absolute value of the filtered energy;

calculating the moving average of the signal;

determining whether the signal is greater than a predetermined minimum, determining whether there is a rapid drop off in the energy of the signal, if the signal is greater than the predetermined minimum, by comparing the current sample of the signal to a previous sample of the signal.

49. The method of claim 48 in which the filtering step passes filtered energy in a frequency range of approximately 100 to 300 Hz.

50. The method of claim 48 in which the filtering step passes filtered energy in a frequency range of approximately 200 to 300 Hz.

51. The method according to claim 48 in which the detecting and confirming occurs by analyzing the signal at a rate of once every 39 mS.

52. The apparatus according to claim 51 in which the rapid drop-off in energy is characterized by having an effective slope of approximately 0.05 to 0.17.

53. The apparatus according to claim 51 in which the rapid drop-off in energy is characterized by having an effective slope of approximately 0.078.

54. The method of claim 48 including further confirming the existence of the hook-flash by:

monitoring the telecommunication for a predetermined time period which commences after the existence of the pulse is detected and confirmed to detect a specific event occurring during that time period the detection of which further confirms whether the remote party has performed a specific act that is consistent with an attempt to initiate a three-way call and the responding in a predetermined manner occurs when the remote party's performance of a specific act that is consistent with an attempt to initiate a three-way call has been detected, confirmed and further confirmed by said monitoring.

55. The method of claim 53 including further confirming the existence of the hook-flash by:

monitoring the telecommunication for a predetermined time period which commences after the existence of the pulse is detected and confirmed to detect a specific event occurring during that time period the detection of which further confirms whether the remote party has performed a specific act that is consistent with an attempt to initiate a three-way call and the responding in a predetermined manner occurs when the remote party's performance of a specific act that is consistent with an attempt to initiate a three-way call has been detected, confirmed and further confirmed by said monitoring.

56. The method of claim 55 further comprising the step of preventing signals originating with the local telephone equipment from interfering with the further confirming of the hook-flash signal.

57. The method of claim 56 wherein the step of preventing signals originating with the local telephone equipment from interfering with the further confirming of the hook-flash signal is accomplished by echo cancellation.

58. The method of claim 56 wherein the step of preventing signals originating with the local telephone equipment from interfering with the further confirming of the hook-flash signal is accomplished by:

muting the local telephone equipment when an energy pulse is detected; and un-muting the local telephone equipment at the conclusion of the predetermined window.

59. The apparatus according to claim 55 in which the step of responding comprises at least one step selected from the group consisting of:

terminating the telecommunication between the local and remote parties;

playing a pre-recorded message;

generating a tone which is heard by one or more parties to the telecommunication;

muting the local telephone; and recording the date and time of the attempt to initiate the three-way call.

60. The apparatus according to claim 55 in which the step of responding comprises terminating the telecommunication between the local and remote parties.

* * * * *